United States Patent
Claessens et al.

(10) Patent No.: US 9,244,238 B2
(45) Date of Patent: Jan. 26, 2016

(54) FILLER ROD FOR CABLE SEAL AND METHOD

(71) Applicant: TYCO ELECTRONICS RAYCHEM BVBA, Kessel-Lo (BE)

(72) Inventors: Bart Mattie Claessens, Hasselt (BE); Dirk Kempeneers, Aarschot (BE); Wouter Foulon, Leuven (BE)

(73) Assignee: TYCO ELECTRONICS RAYCHEM BVBA, Kessel-Lo (BE)

( * ) Notice: Subject to any disclaimer, the term of this patent is extended or adjusted under 35 U.S.C. 154(b) by 206 days.

(21) Appl. No.: 13/894,901

(22) Filed: May 15, 2013

(65) Prior Publication Data
US 2013/0315551 A1 Nov. 28, 2013

Related U.S. Application Data

(60) Provisional application No. 61/651,869, filed on May 25, 2012.

(51) Int. Cl.
*G02B 6/44* (2006.01)
*G02B 6/46* (2006.01)

(52) U.S. Cl.
CPC ............ *G02B 6/4429* (2013.01); *G02B 6/4444* (2013.01); *G02B 6/4447* (2013.01); *G02B 6/46* (2013.01); *Y10T 29/49826* (2015.01)

(58) Field of Classification Search
CPC .......................... G02B 6/4444; G02B 6/4447
See application file for complete search history.

(56) References Cited

U.S. PATENT DOCUMENTS

| | | | | |
|---|---|---|---|---|
| 3,518,358 A * | 6/1970 | Brown | ...................... | 174/138 F |
| 4,079,193 A * | 3/1978 | Channell | ................... | 174/138 F |
| 4,267,401 A * | 5/1981 | Wilkinson | ................. | 174/77 R |
| 5,886,300 A * | 3/1999 | Strickler | ....................... | 174/135 |
| 6,875,926 B2 * | 4/2005 | Buekers et al. | ................. | 174/100 |
| 7,327,927 B2 * | 2/2008 | Olson et al. | .................. | 385/138 |
| 8,686,289 B2 * | 4/2014 | Burke et al. | ................. | 174/77 R |
| 8,917,966 B2 * | 12/2014 | Thompson et al. | ........... | 385/136 |
| 2008/0224419 A1 * | 9/2008 | Mullaney et al. | ............. | 277/602 |
| 2013/0183019 A1 * | 7/2013 | Hsing | ........................... | 385/135 |
| 2014/0226935 A1 * | 8/2014 | Allen | .............................. | 385/59 |

FOREIGN PATENT DOCUMENTS

AU         589829 B2    10/1989
WO    WO 2004/051338 A1    6/2004

OTHER PUBLICATIONS

European Search Report for Application No. 13169142.0 mailed Nov. 18, 2013.

* cited by examiner

*Primary Examiner* — Michelle R Connelly
(74) *Attorney, Agent, or Firm* — Merchant & Gould P.C.

(57) ABSTRACT

Optical fiber cables (180) are installed at an enclosure defining at least one cable port (109) by loading a seal block assembly (120, 140, 220, 340) onto each optical fiber cable (180); installing and/or connecting a fixation assembly (160, 460) onto each optical fiber cable (180); and latching the seal block assembly (120, 140, 220, 340) to the enclosure. The cable (180) is secured by the fixation assembly (160, 460). The fixation assembly (160, 460) retains one or more types of strength members (182, 183) of the optical fiber cable (180). The seal block assembly (120, 140, 220, 340) snaps and/or clips into a locked position relative to the enclosure. A filler rod (502) can be used to fill an unused port in the seal block assembly (120, 140, 220, 340). An attachment device (504) can be used to connect to the filler rod (502) for adding a new tube (510) to the seal block assembly.

11 Claims, 34 Drawing Sheets

FILLER ROD FOR CABLE SEAL AND METHOD

CROSS-REFERENCE TO RELATED APPLICATION

The present patent application claims the benefit of U.S. Provisional Patent Application Ser. No. 61/651,869, filed May 25, 2012, which application is hereby incorporated by reference in its entirety.

TECHNICAL FIELD

The present disclosure relates to telecommunications enclosures, and more particularly, to telecommunications enclosures including cable port assemblies that seal fiber optic cables entering the enclosures.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters, and wavelength division multiplexers.

It is often preferred for telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures. Telecommunications enclosures are typically sealed to inhibit the intrusion of moisture or other contaminants.

Cables enter the enclosures at sealed cable ports. Cables may be secured to the enclosures using clamps and/or strength members (e.g., rods or aramid yarn) to inhibit axial and/or lateral pull.

SUMMARY

Aspects of the disclosure are directed a cable seal block for a port, the block including a first housing portion; a second housing portion; a gasket disposed between the first housing portion and the second housing portion; and an activation assembly that axially compresses the gasket when actuated. The first housing portion forms a first end of the cable sealing assembly, and defines a stop surface. The first housing portion may include at least one latching finger extending outwardly past the stop surface in an axial direction to mount the block to the port. A C-shaped locking clip may be used in addition to, or in the alternative to, mount the block to the port.

Aspects of the disclosure also are directed to a cable fixation assembly for mounting to an optical cable having at least one optical fiber and at least one strength member. The cable fixation assembly mounts to a section of the cable at which a jacket has been stripped to reveal the buffered fibers and strength members. The cable fixation assembly includes a body defining a channel extending from a first end of the body towards a second end of the body.

The cable fixation assembly may include an enclosing structure defining a first pocket at the second end of the body. The pocket is sized to receive the at least one strength member. A flexible flange is coupled to the body to at least partially define the first pocket. The flexible flange is configured to flex into and out of the first pocket. A tightening member is mounted to the body and is configured to selectively force the flexible flange towards the first pocket.

The cable fixation assembly may include a plate element which is used to press against the cable strength member.

A cable clamp may also be provided to press against the exterior of the cable jacket.

In some cases the cable may or may not utilize flexible strength members such as aramid yarns. In other cases, the cable may or may not utilize more rigid strength members such as glass rods. Some cable may use both.

In some cases the cable fixation includes fixing the cable by the jacket exterior clamp, the strength member clamp such as in the form of a glass rod clamp, and a yarn fixation device. In other cases the cable fixation includes fixing by the jacket exterior clamp and the strength member clamp such as in the form of a glass rod clamp.

Aspects of the disclosure also are directed to a cable port assembly including a seal block assembly and a fixation assembly. The seal block assembly defines at least one axial passage that is sized to receive at least one fiber optic cable. The seal block assembly includes a gasket that is activated through axial compression. The seal block has a stop surface and may have a latching finger that cooperate to axially fix the seal block assembly to a cable port defined at an enclosure. The fixation assembly defines an axial channel sized to receive the at least one fiber optic cable. The fixation assembly also is configured to receive and secure at least one strength member of the at least one fiber optic cable.

The fixation assembly may be mounted separately from the seal block assembly, or it may be mounted to and/or extend from the seal block assembly.

One fixation assembly mounted to the seal block includes a cable jacket clamp mounted with a fastener to press against an exterior of the jacket. A glass rod fixation clamp includes a fastener mounted plate to press against the glass rod strength member.

One separate fixation assembly defines a pocket having an open face and a slot at the first end of the fixation assembly. The open face extends generally parallel to the axial channel. The open face and slot together define a T-shaped profile for mounting directly to the enclosure.

Aspects of the disclosure also are directed to an enclosure arrangement including a base defining at least one cable port at a first end, the cable port leading from an exterior of the base to an interior of the base. The enclosure arrangement also includes a duct extending through the at least one cable port, and a mounting screw disposed within the interior of the base at the first end of the base adjacent the duct. The duct includes stops extending inwardly into the axial passage at an interior end of the duct. The mounting screw, which has a head facing the interior of the base, is positioned outside of a perimeter of the axial passage through the duct and allows for mounting of the separate fixation assembly.

Aspects of the disclosure are also directed to an enclosure arrangement where the seal block assembly and the fixation assembly are together as a single unit, allowing the cable to be loaded into the seal block and the fixation assembly to be activated outside of the enclosure, then the cable and the single unit inserted into the cable port. At that point, the seal block assembly can be activated.

Aspects of the disclosure also are directed to a method of installing an optical fiber cable at an enclosure defining at least one cable port at a first end of the enclosure. The method includes loading a seal block assembly onto the optical fiber cable; installing a fixation assembly onto a stripped region of the optical fiber cable; and securing the fixation assembly to the enclosure. Installing the fixation assembly includes routing at least one optical fiber of the optical fiber cable through the fixation assembly and securing at least one strength member of the optical fiber cable to the fixation assembly. Securing the fixation assembly includes hooking the fixation assembly onto a mounting screw protruding inwardly from the first end of the enclosure and tightening the mounting screw to axially secure the optical fiber cable to the first end of the enclosure.

Aspects of the disclosure also are directed to a method of installing an optical fiber cable at an enclosure defining at least one cable port at a first end of the enclosure. The method includes loading a seal block assembly onto the optical fiber cable; installing a fixation assembly onto a stripped region of the optical fiber cable; and inserting the fixation assembly and seal block assembly into the port of the enclosure a the same time. Installing the cable includes installing the cable in the seal block assembly, and routing at least one optical fiber of the cable through the fixation assembly and securing at least one strength member of the optical fiber cable to the fixation assembly.

Aspects of the disclosure relate to securing the yarn of the cable if present with a yarn clamp.

Aspects of the disclosure relate to clamping of the jacket by pressing on an exterior of the jacket.

Aspects of the disclosure are also related to a filler rod removal system and method. If a filler rod is positioned in a seal block assembly, the filler rod is provided with an attachment device to attach to a new tube which can be pushed and/or pulled through the seal block assembly into position during connection of the filler rod and the new tube. Typically, the new tube is added when the seal block assembly is deactivated.

One attachment device for the filler rod is one or more barbed projections which fit into the new tube, such as a corrugated tube. Generally, the filler rod and the new tube have the same outer diameter.

Once the new tube is located in position in the seal block assembly, the filler rod can be separated from the new tube and discarded, and cables and/or blown tubes can be inserted through the new tube. The seal block assembly can also be reactivated to seal the new tube.

One of the ports is non-circular, sized for use with a loop cable. In one embodiment, the loop cable is passed through two main outer axial passages. The seal activation assembly is located in general alignment between the two outer axial passages. An extra axial passage in general alignment between the two outer axial passages is provided for adding cables. In another embodiment, the loop cable is passed through two main adjacent axial passages, and the extra axial passage and the seal activation assembly are located outside of the two adjacent main axial passages.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

In general, optical fiber cables may be routed into an enclosure through one or more cable ports. The cables are mounted to cable port assemblies to secure the cables to the base and to seal the ports around the cables. Certain types of cable port assemblies include seal block assemblies to seal the ports. Certain types of cable port assemblies include fixation assemblies to secure (e.g., axially secure, torsionally secure, laterally secure, etc.) the optical cables. In certain implementations, the fixation assemblies axially fix the optical cables separate from the seal block assemblies. In other certain implementations, the fixation assemblies axially fix the optical cables together with the seal block assemblies.

Figure 1:
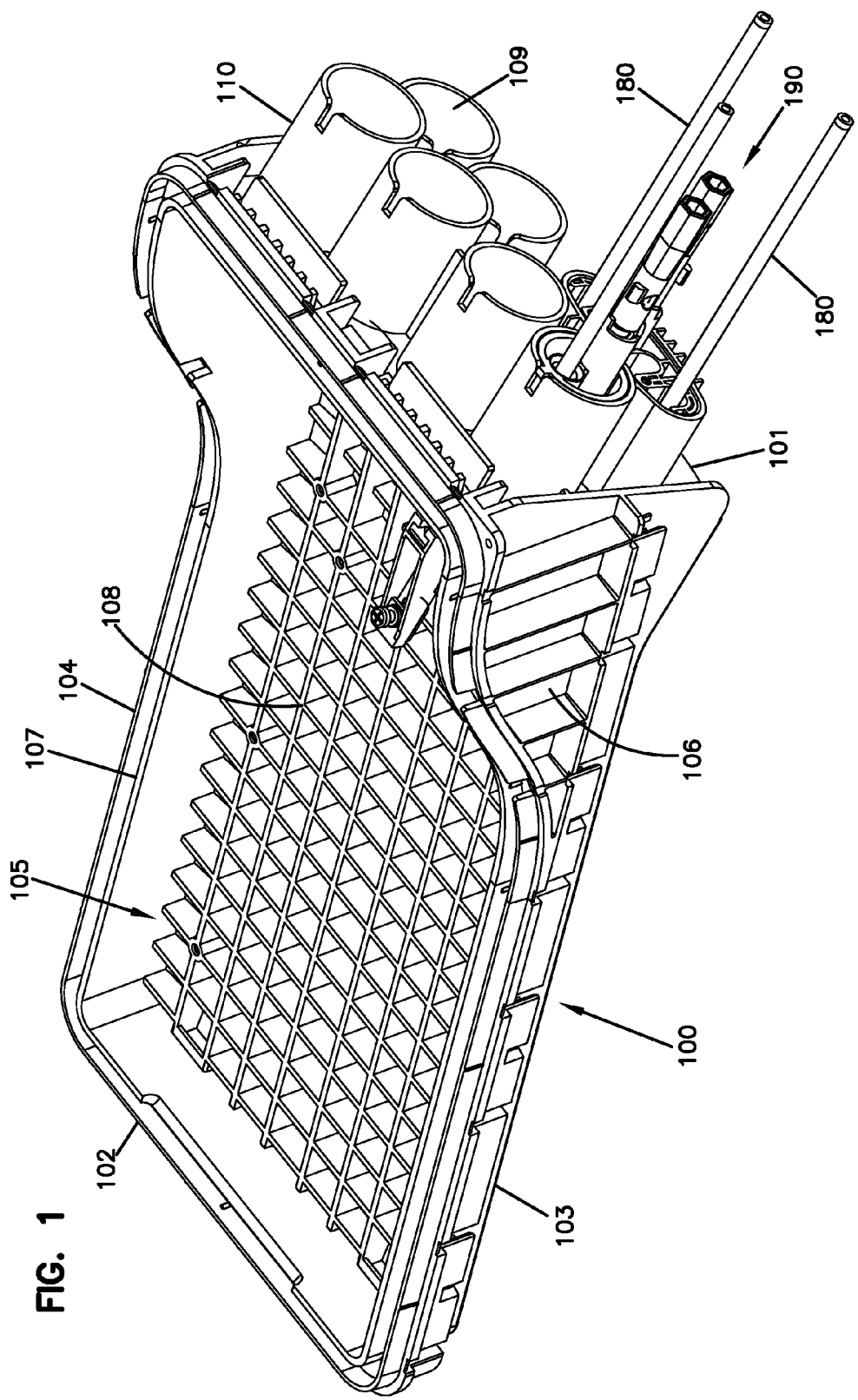
FIG. 1 is a top, front perspective view of an example base defining cable ports at a first end at which two cable port assemblies are received.

FIG. 1 is a perspective view of an example base 100 of an example telecommunications enclosure assembly. The base 100 extends from a first end 101 to a second end 102. The base 100 also extends from a first side 103 to a second side 104. The base 100 includes a sidewall 106 extending upwardly from a base 108 to define an interior 105. The base 100 is shaped and configured to cooperate with a cover to form an enclosure that defines an interior. One or more telecommunications components may be mounted within the interior of the enclosure. For example, a splice tray assembly may be mounted within the interior.

A gasket or sealing ring may be disposed between the base 100 and the cover around the perimeter of the enclosure. The gasket inhibits dirt, water, or other contaminants from entering the enclosure when the cover is secured to the base 100 (e.g., by the latches). In some implementations, the base 100 defines a gasket channel 107 in which the gasket may seat. In certain implementations, the cover includes a tongue that extends downwardly so that the tongue compresses the gasket in the channel 107 when the cover is disposed on the base 100. In other implementations, the cover may define a second channel instead of the tongue to accommodate the gasket. In still other implementations, the cover may define the channel and the base 100 may define the tongue.

A latch arrangement may be provided to releasably secure the cover in a closed position relative to the base 100. The latch arrangements may be released to enable the cover to be removed from the base 100. Additional details regarding an example latch arrangement, an example splice tray assembly, and an example cover can be found in U.S. Provisional Application No. 61/506,378, filed Jul. 11, 2011, and titled "Telecommunications Enclosure with Splice Tray Assembly," the disclosure of which is hereby incorporated herein.

The base 100 defines one or more cable ports 109 at the first end 101 of the base 100. Each cable port 109 is configured to receive a cable port assembly 190 (FIG. 15) including a seal block 120, 140 and a fixation device 160. Fiber optic cables 180 are routed into and out of the enclosure through the seal blocks and are fixed to the enclosure using the fixation devices. In the example shown, the base 100 includes seven ports 109. In other implementations, however, the base 100 may include a greater or lesser number of ports 109. Input and output cables may be routed into the base 100 through the ports 109. As used herein, the terms "input" and "output" are used for convenience and are not intended to be exclusory. Optical signals carried over optical fibers may travel in either or both directions. Accordingly, optical fibers routed through any of the ports 109 may carry input and/or output signals.

In some implementations, at least one of the ports 109 has a different size and/or shape from at least one other port 109. In the example shown, one of the ports 109 defines an oval or oblong cross-sectional profile and the other six ports 109 define round cross-sectional profiles. In other implementations, each of the ports 109 may have any desired cross-sectional profile. In still other implementations, one or more of the round ports 109 may be larger or smaller than others of the round ports 109.

Ducts 110 extend through the first end 101 of the base 100 to define the cable ports 109. The ducts 110 are generally sized and shaped to fit within a respective one of the cable ports 109. In some implementations, a tear-off sealing member is disposed in one or more of the ducts 110. Each sealing member extends across the duct 110 to inhibit contaminants from entering the enclosure. The sealing members are connected to the ducts with weak webs or other frangible connections that facilitate removing the sealing members from the ducts 110. Accordingly, the sealing members temporally seal the ducts 110 until the cable port is needed.

Figure 2:
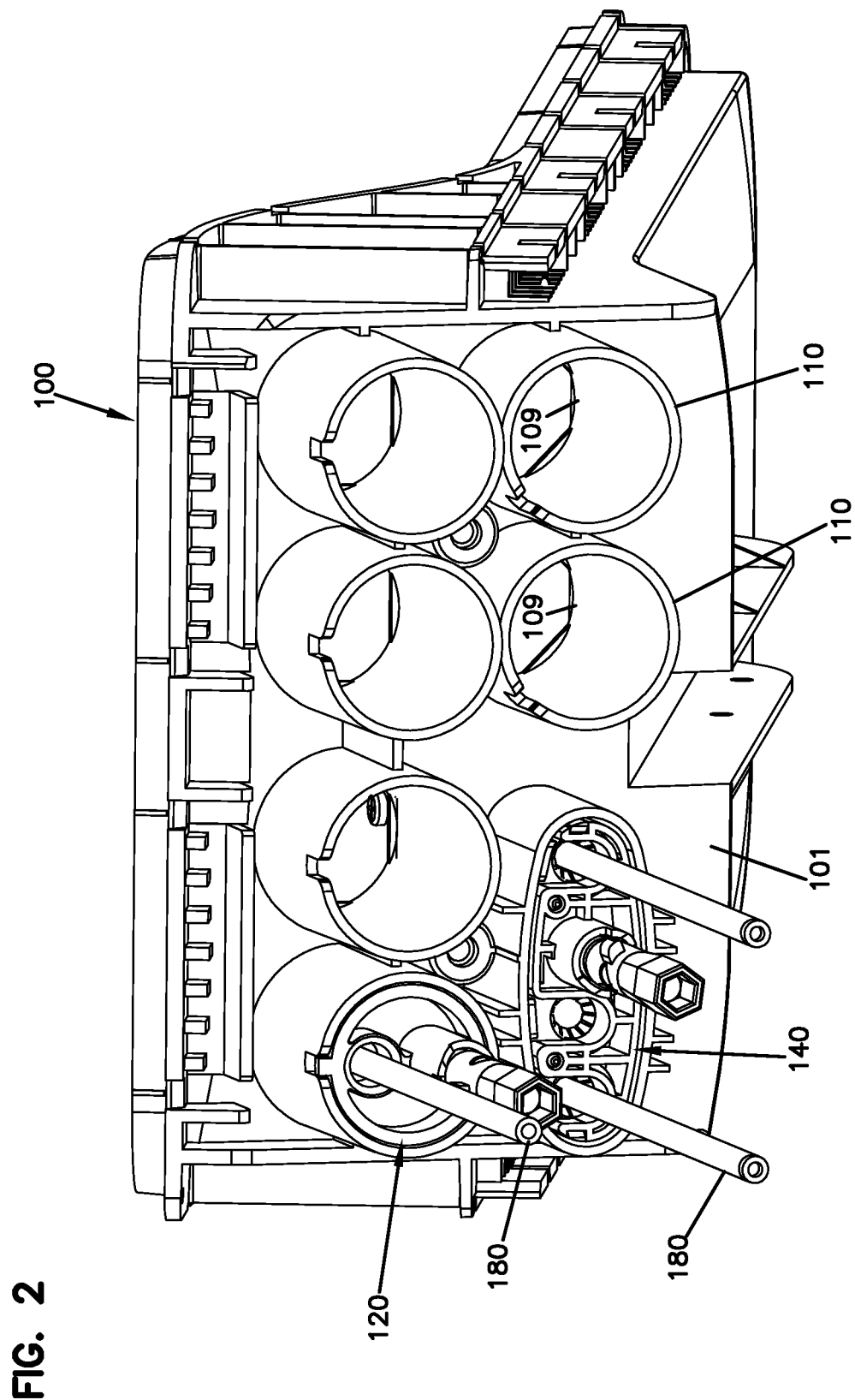
FIG. 2 is a front perspective view of the base and seal block assemblies.
Figure 3:
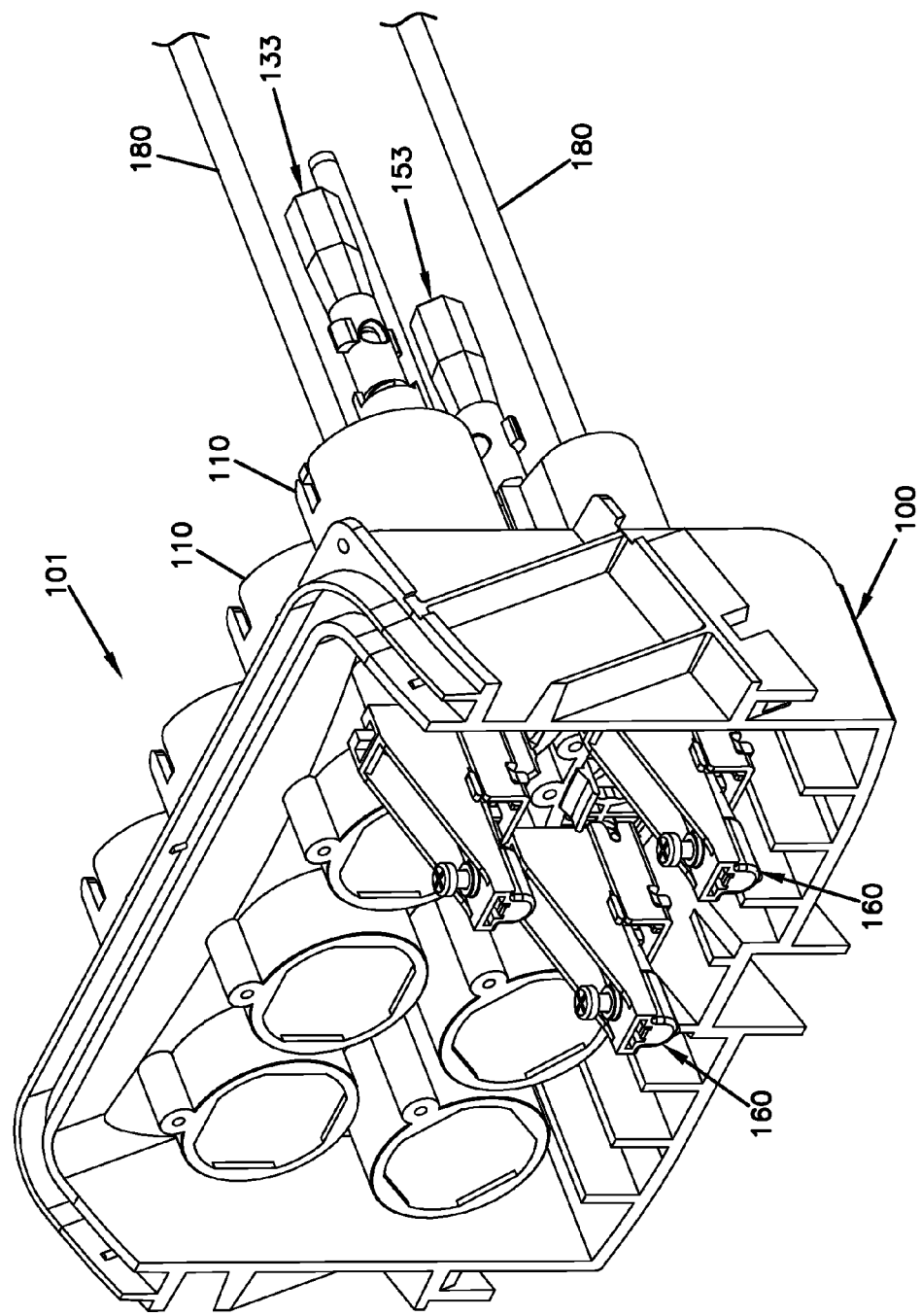
FIG. 3 is a top, rear perspective view of the first end of the base and the cable port assemblies.
Figure 4:
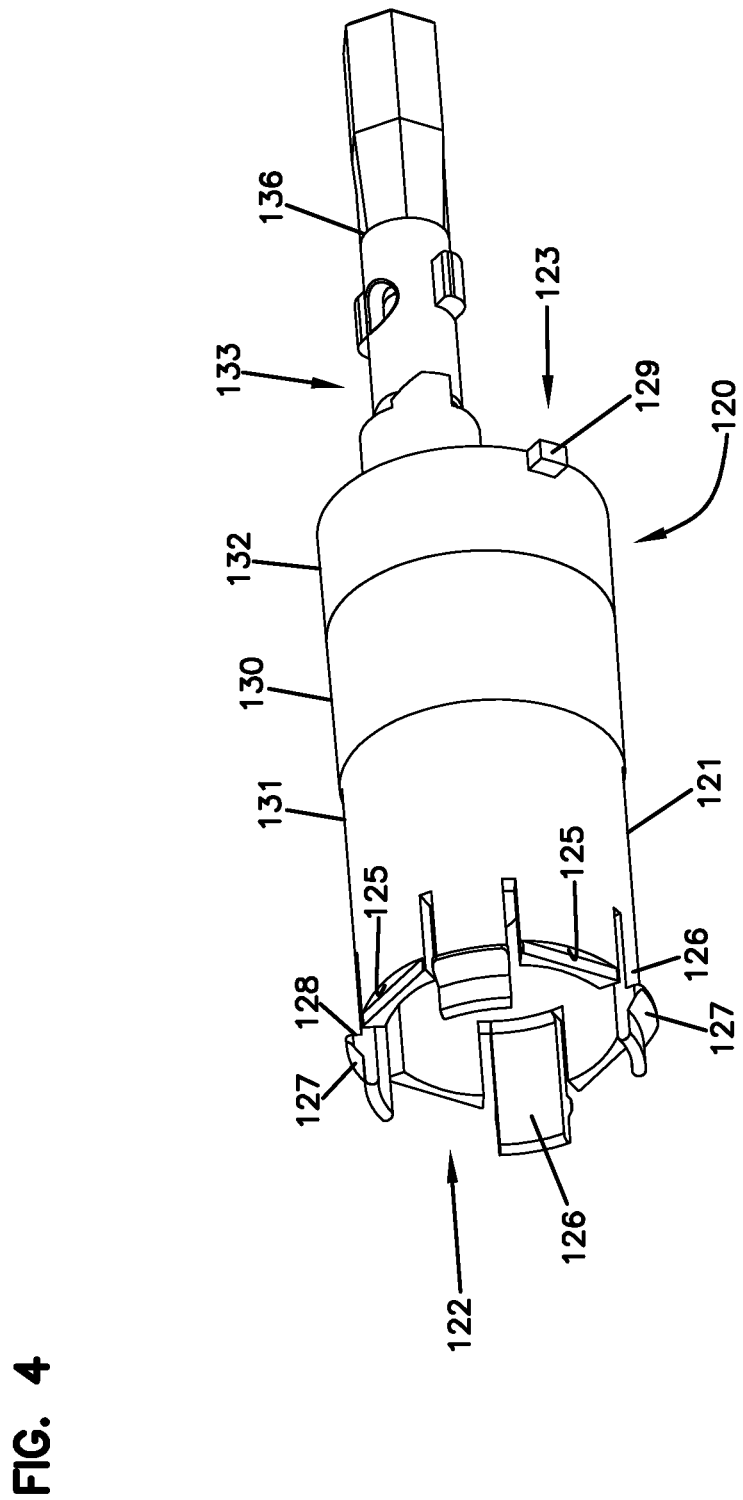
FIG. 4 is a perspective view of an example round-type seal block assembly.

As shown in FIGS. 2 and 3, each of the ducts 110 has a first end extending partially into the interior 105 of the base 100 and a second end extending outwardly from the first end 101 of the base 100. By disposing a portion of each duct 110 within the base interior 105, an overall length of the base 100 is reduced as compared to a base having ducts 110 extending only outside of the base 100. In the example shown, a majority of each duct 110 extends outwardly from the first end 101 of the base 100. In other implementations, however, a greater portion of each duct may extend into the interior 105.

One or more fiber optic cables 180 may be routed into the interior 105 of the base 100 through one or more of the cable ports 109. To inhibit the ingress of contaminants (e.g., dirt, water, etc.) and pests (e.g., insects, rodents, etc.) into the base 100, the cable ports 109 are sealed around the cables 180. In accordance with some aspects of the disclosure, seal block assemblies may be used to seal the cable ports 109. In general, seal blocks include a gasket that activates (e.g., performs sealing functions) upon compression. In one example implementation, the gasket includes a gel-based gasket. In other implementations, however, other types of gaskets may be utilized.

Each seal block includes a gasket disposed between a first housing portion and a second housing portion. In some implementations, each housing portion is formed from an integral piece. In other implementations, each housing portion is formed from multiple pieces. An activation assembly selectively forces the first and second housing portions together to squeeze the gasket therebetween. Axial passages are provided through the housing portions and the gasket to allow optical fiber cables 180 to be routed through the seal block.

In the example shown in FIGS. 1-3, a first seal block assembly 120 is disposed within one of the ducts 110 at one of the cable ports 109. The first seal block assembly 120 is configured to fit within one of the round cable ports 109. The first seal block assembly 120 includes a body 121 extending from a first end 122 to a second end 123. An axial passage 124 (FIG. 5) extends through the body 121 from the first end 122 to the second end 123. One or more optical fiber cables 180 may be routed through the axial passage 124. In some implementations, the axial passage 124 extends along center longitudinal axis of the body 121. In other implementations however, the axial passage 124 may be offset from the center (e.g., see FIG. 5).

One or more stop surfaces (e.g., shoulders, notches, lips, etc.) 125 are disposed at the first end 122 of the body 121. In some implementations, the stop surfaces 125 are formed by the edge of the first end 122 of the seal block assembly 120. In other implementations, the stop surfaces 125 are notched surfaces offset from the edge of the first end 122. For example, the stop surfaces may define circumferentially spaced shoulders cut into an exterior surface of the seal block body 121 at the first end 122. In certain implementations, one or more tabs 129 are disposed at the second end 123 of the body 121.

The seal block assembly body 121 also includes a latching arrangement to secure the body 121 at the cable port 109. In the example shown, the latching arrangement includes one or more flexible fingers 126 at the first end 122 of the body 121. A ramp 127 and a shoulder 128 are disposed on an external surface of each flexible finger 126. In certain implementations, the flexible fingers 126 extend axially from the first end 122 of the body 121 past the stop surface 125. In the example shown, four latching fingers 126 extend from circumferentially spaced locations at the first end 122 of the body 121. In other implementations, however, the body 121 may have a greater or lesser number of latching fingers 126.

The seal block body 121 is configured to seal a cable port 109 when plugged into the cable port 109. In the example shown, the seal block body 121 includes a gasket 130 (e.g., a gel structure, a foam structure, a rubber structure, etc.) sandwiched between a first body portion and a second body portion. In the example shown, the first body portion includes an integral body piece 131 and the second body portion includes a second integral body piece 132. An activation assembly 133 holds the body pieces 131, 132 together and selectively axially compresses the gasket 130 therebetween to activate the seal.

Figure 5:
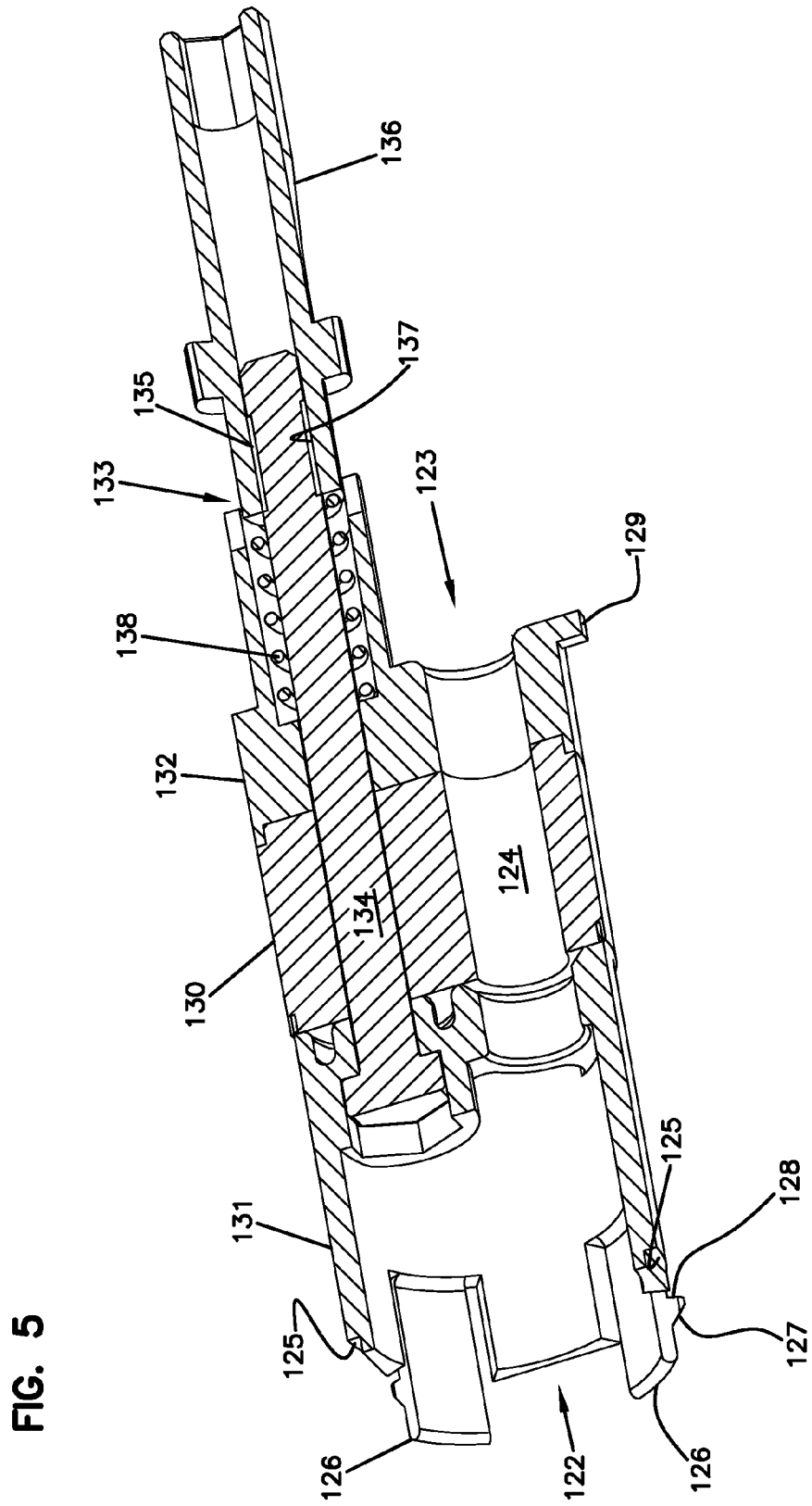
FIG. 5 is a perspective view of the seal block assembly of FIG. 4 shown along an axial cross-section.
Figure 6:
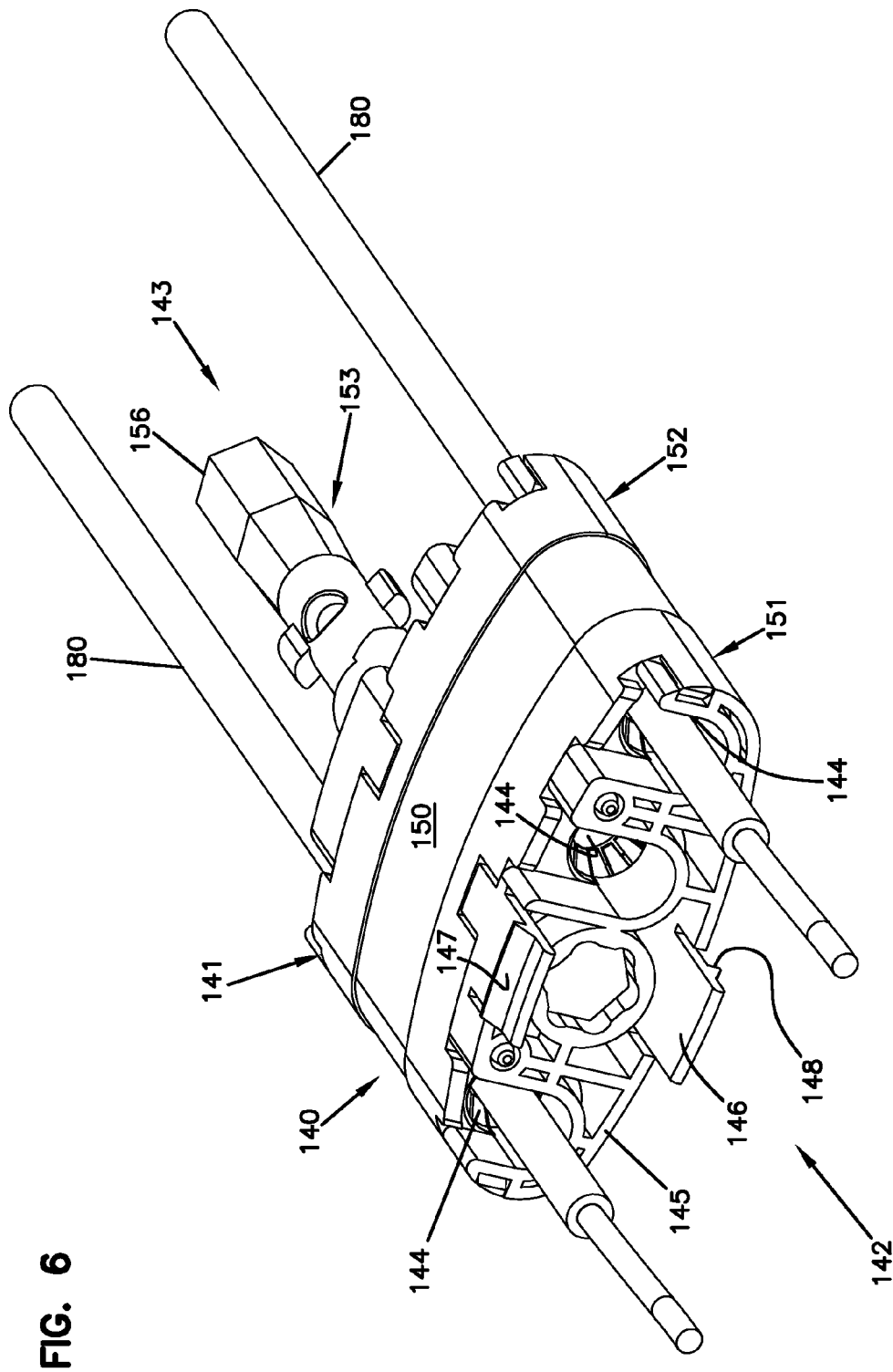
FIG. 6 is a perspective view of an example oblong-type seal block assembly.

In the example shown in FIG. 5, the activation assembly 133 includes a screw 134 having a threaded region 135, a grip 136 having a threaded region 137, and a spring 138. The screw 134 extends axially through the gasket 130. A first end of the screw 134 is secured to the first body piece 131 and a second end of the screw 134 protrudes from the second body piece 132. The threaded region 137 of the grip 136 cooperates with the threaded region 135 of the screw 134 to telescopically mount the grip 136 to the second end of the screw 134. The spring 138 is mounted over the screw 134 so that tightening the grip 136 on the screw 134 compresses the spring 138. As the spring 138 is compressed, the spring 138 exerts a greater axial bias on the gasket 130 (see FIG. 5).

Figure 7:
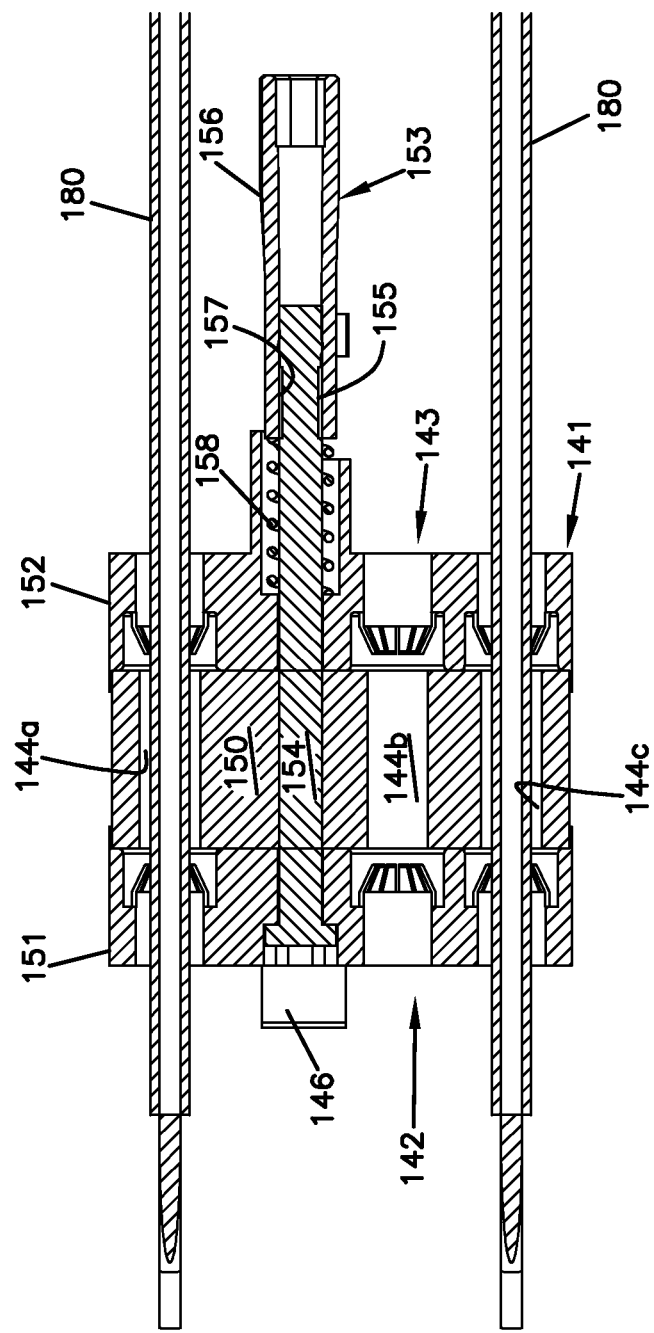
FIG. 7 is a top plan view of the seal block assembly of FIG. 6 shown along an axial cross-section.

A second seal block assembly 140 is disposed within another of the ducts 110 at one of the cable ports 109. The second seal block assembly 140 is configured to fit within the oblong cable port 109. The second seal block assembly 140 includes a body 141 extending from a first end 142 to a second end 143. One or more axial passages 144 (FIG. 7) extend through the body 141 from the first end 142 to the second end 143. One or more optical fiber cables 180 may be routed through each of the axial passage 144. In the example shown, a first axial passage 144a extends along a first side of the body 141, a second axial passage 144b extends along an intermediate region of the body 141, and a third axial passage 144c extends along a second side of the body 141 opposite the first side. In other implementations however, the body 141 may include a greater or lesser number of axial passages 144 or may have a different configuration of axial passages.

The first end 142 of the body 141 defines a first stop surface 145. The seal block assembly body 141 also includes a latching arrangement to secure the body 141 at the respective cable port 109. In the example shown, the latching arrangement includes one or more flexible fingers 146 at the first end 122 of the body 121. A ramp 147 and a shoulder 148 are disposed on an external surface of each flexible finger 146. In certain implementations, the flexible fingers 146 extend axially from the first end 142 of the body 141 past the first stop surface 145. In the example shown, one latching finger 146 extends from each of the elongated sides of the body 141. In other implementations, however, the body 141 may include a greater or lesser number of latching fingers 146.

The seal block body 141 is configured to seal a cable port 109 when plugged into the respective duct 110. In the example shown, the seal block body 141 includes a gasket 150 (e.g., a gel structure, a foam structure, a rubber structure, etc.) sandwiched between a first body portion and a second body portion. In the example shown, the first body portion includes a first body assembly 151 and the second body portion includes a second body assembly 152. In certain implementations, each of the body assemblies 151, 152 include two or more sections that cooperate to define the axial passages 144. The sections of the body assemblies 151, 152 may be separated to load the fiber optic cables within the body assemblies 151, 152 (e.g., see FIG. 7).

An activation assembly 153 holds the body assemblies 151, 152 together and selectively axially compresses the gasket 150 therebetween to activate the seal. In the example shown in FIG. 7, the activation assembly 153 includes a screw 154 having a threaded region 155, a grip 156 having a threaded region 157, and a spring 158. The screw 154 extends axially through the gasket 150. A first end of the screw 154 is secured to the first body assembly 151 and a second end of the screw 154 protrudes from the second body assembly 152. The threaded region 157 of the grip 156 cooperates with the threaded region 155 of the screw 154 to telescopically mount the grip 156 to the second end of the screw 154. The spring 158 is mounted over the screw 154 so that tightening the grip 156 on the screw 154 compresses the spring 158. As the spring 158 is compressed, the spring 158 exerts a greater axial bias on the gasket 150 (see FIG. 7).

Figure 8:
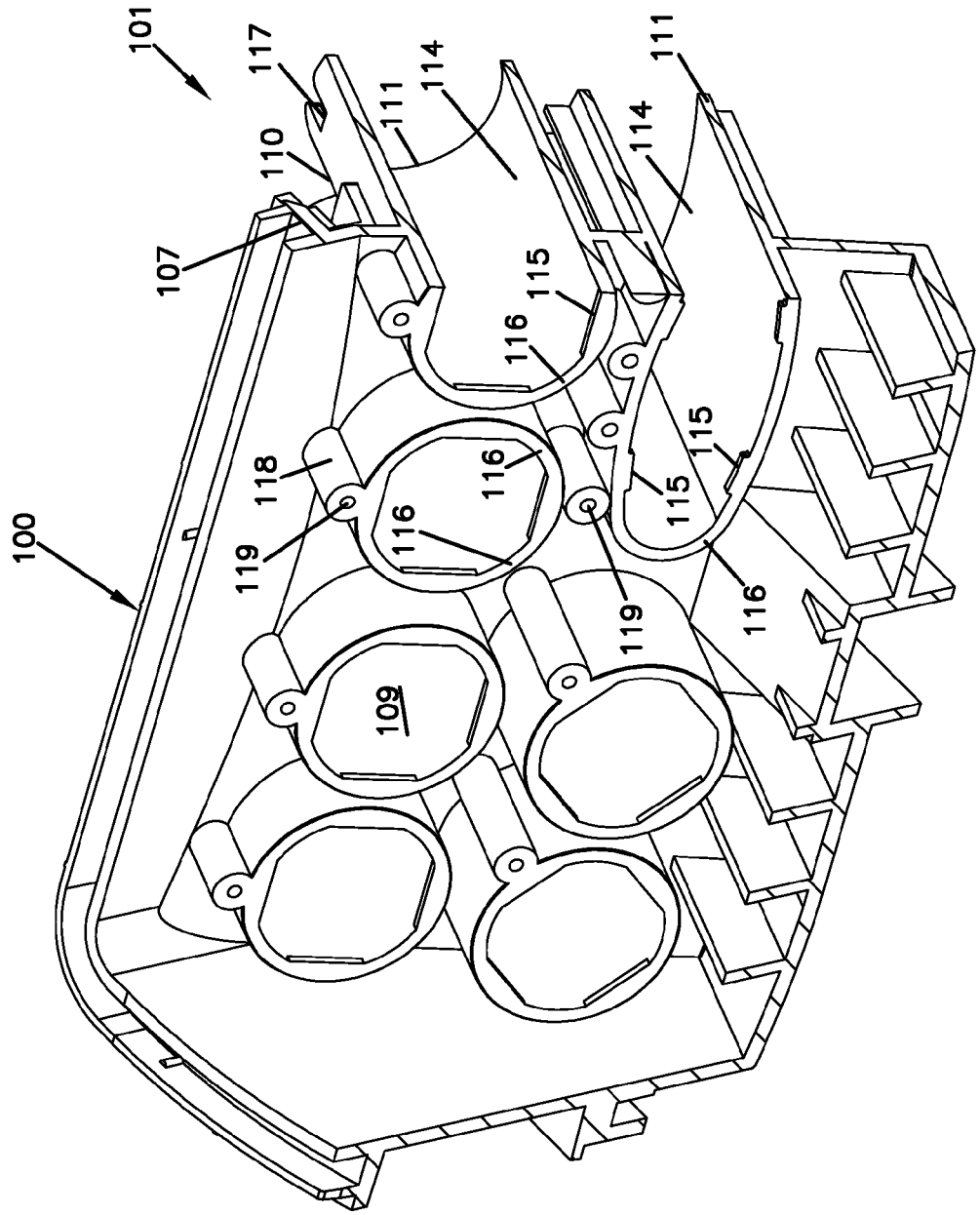
FIG. 8 is a top, rear perspective view of the first end of the base with a side portion of the base hidden to reveal a cross-section of two cable ports.

FIG. 8 illustrates the front end 101 of the enclosure base 100 from the interior 105 of the base 100. As noted above, the first end 101 defines multiple ports 109 leading into the interior 105 of the base 100. In the example shown, the first end 101 defines a first row of round ports 109 and a second row of round and oblong ports 109. In other implementations, the ports 109 may by arranged in any desired configuration.

In the example shown, the ports 109 are defined by ducts 110 extending into and out of the base 100. Each duct 110 includes an elongated body 111 extending from an outer end 112 to an inner end 113. Each elongated body 111 defines an axial passage 114 extending from the outer end 112 to the inner end 113. The inner end 113 of the elongated body 111 defines a shoulder 116 that faces the interior 105 of the base 100. In the example shown, the shoulder 116 extends around the circumference of the inner end 113. In other implementations, however, the shoulder 116 may be broken/interrupted along the circumference.

One or more stops 115 are disposed at the inner end 113 of the elongated body 111 and extend into the passage 114. In the example shown, four circumferentially spaced stops 115 extend inwardly at the inner end 113 of each elongated body 111. In other implementations, however, a greater or lesser number of stops 115 may extend inwardly from the elongated body 111. In certain implementations, one or more of the elongated bodies 111 may define one or more slots 117 at the outer end 112 of the elongated body 111. In the example shown, the outer end 112 defines a single slot that is useful for aligning the seal block assembly 120 at the duct 110.

One or more fastener supports 118 may be disposed at the inner ends 113 of the ducts 110. Each fastener support 118 defines a fastener hole 119 accessible from the interior 105 of the base 100. The fastener supports 118 aid in securing the optical fiber cables 180 separate from the seal blocks 120, 140 as will be discussed in more detail herein.

Figure 9:
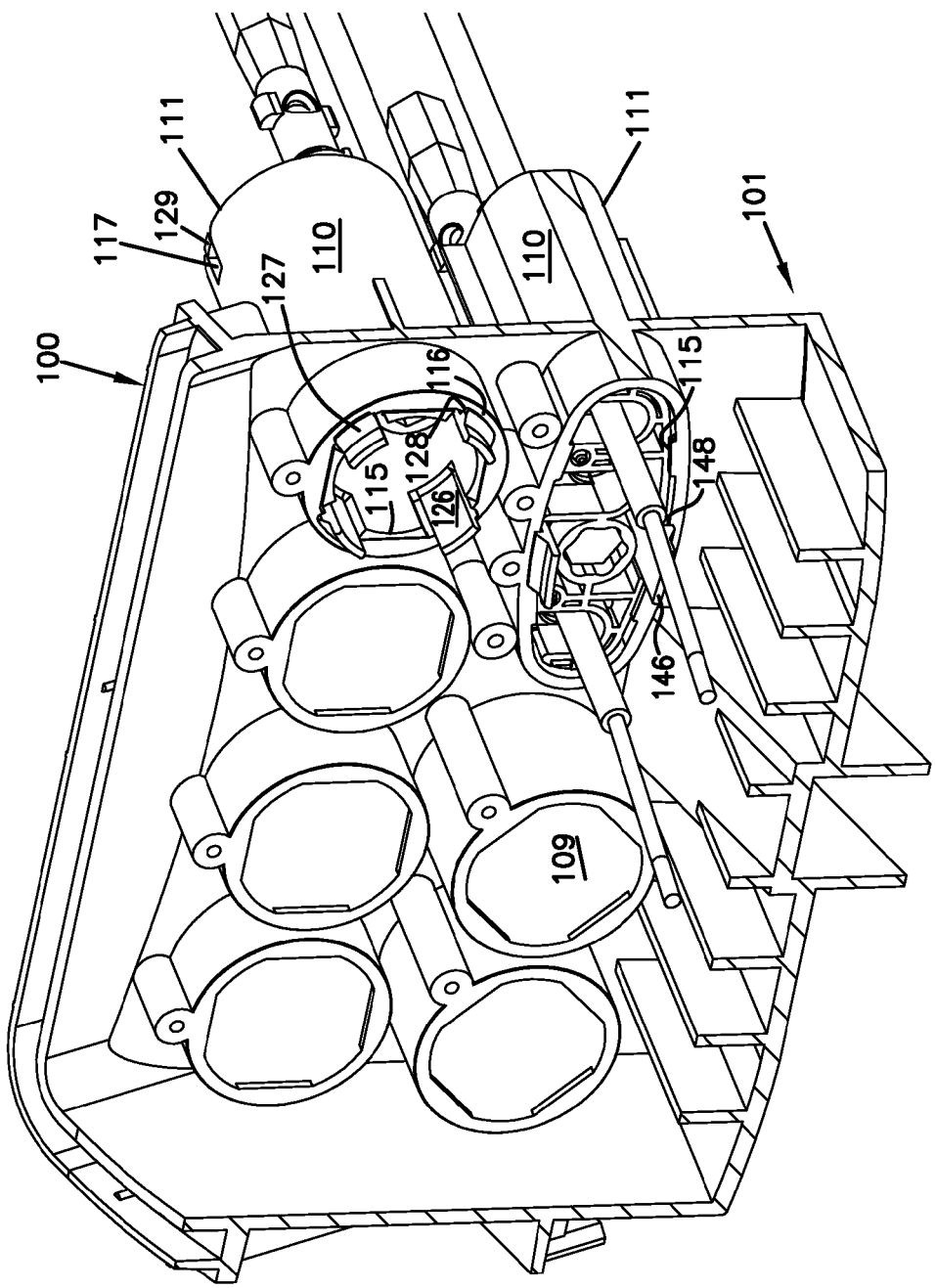
FIG. 9 is a top, rear perspective view of the first end of the base with two seal blocks mounted at the cable ports that were shown in cross-section in FIG. 8, a side portion of the base being hidden for ease in viewing the inner ends of the ports.

FIG. 9 shows the example seal blocks 120, 140 secured at respective cable ports 109. Each seal block 120, 140 is inserted through the axial passage 114 defined by the elongated body 111 of the duct 110 installed at the respective cable port 109. The first end 122, 142 of each seal block body 121, 141 is inserted through the outer end 112 of each duct and pushed towards the inner end 113 until the stop surfaces 125, 145 of each seal block body 121, 141 abuts the stops 115 of the respective duct 110. The stops 115 inhibit the seal block bodies 121, 141 from being pushed too far into the base 100.

As the seal block body 121, 141 is pushed toward the inner end 113 of the duct 110, the latching fingers 126 cam inwardly to pass the inner end 113 and snap over the shoulder 116 of the duct body 111. The shoulder 128, 148 of the latching fingers 126, 146 abuts the shoulder 116 of the duct body 111 to inhibit the seal block bodies 121, 141 from being pulled out of the ducts 110. Accordingly, a user need not separately fasten (e.g., with screws) the seal blocks 120, 140 to the base 100. Merely pushing the seal blocks 120, 140 into position secures the seal blocks 120, 140 to the base 100. The latching fingers 126 are manually releasable by compressing the latching fingers 126 inwardly until the shoulders 128, 148 clear the inner shoulder 116 of the ducts 110.

In certain implementations, the duct bodies 111 include alignment structures that facilitate mounting the seal blocks in accordance with a preferred orientation. For example, the slot 117 at the outer end 112 of the round ducts 110 may be sized and shaped to receive the tab 129 disposed at the second end 123 of the first seal block body 121. In other implementations, the tab 129 also aids in inhibiting the seal block body 121 from being inserted too far into the duct 110. In still other implementations, one or more tabs may be disposed on the oblong seal block 140.

The gasket 130, 150 of each seal block 120, 140 is spaced towards the exterior of the base 100 from the point at which the seal block 120, 140 is axially fixed to the base 100. In some implementations, the stops 115 and/or tab 129 aid in maintaining the seal block 120, 140 within the ducts 110 when pressure is applied to the seal block 120, 140 from outside the base 100. External pressure applied to the seal block 120, 140 will further compress the gasket 130, 150 axially since the stops 115 and/or tab 129 maintain the seal block 120, 140 in a fixed axial position.

Figure 10:
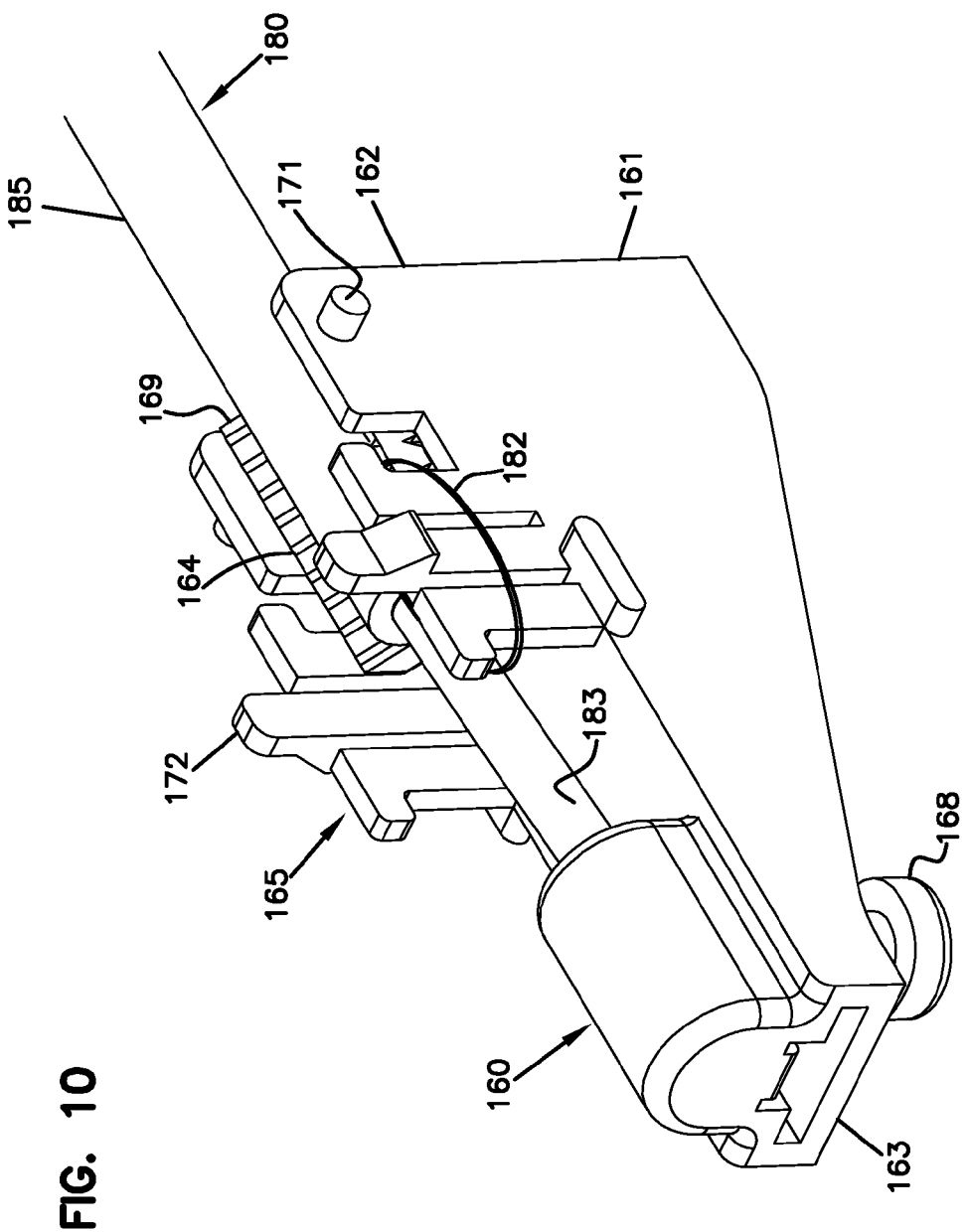
FIG. 10 is a bottom perspective view of an example fixation assembly coupled to a stripped region of an optical cable where the optical fibers of the cable are hidden for clarity.

In accordance with some aspects, the optical fiber cables 180 may be secured to the base 100 separate from the seal blocks 120, 140 using fixation mounts 160 (FIG. 10). A fixation mount 160 is coupled to an optical fiber cable 180 at a location where one or more strength members have been terminated (e.g., trimmed). The fixation mount 160 is coupled to an interior 105 of the base 100. For example, the fixation mount 160 may be coupled to the inner surface of the first end 101 of the base 100. In certain implementations, the fixation mount 160 axially fixes the cable 180 relative to the base 100. In certain implementations, the fixation mount 160 torsionally fixes the cable 180 relative to the base 100. In certain implementations, the fixation mount 160 laterally fixes the cable 180 relative to the base 100. Accordingly, stress applied to the cables 180 is not transferred to the seal blocks 120, 140 and, hence, does not affect the seal at the respective port 109.

The fiber optic cables 180 include one or more optical fibers 181 and at least one strength member. In certain implementations, the optical fibers 181 are contained within a buffer tube. A jacket 185 is stripped or otherwise removed at a section of the cable that is to be secured to the enclosure. Stripping the jacket 185 reveals the optical fiber(s) 181 and one or more strength members. The strength members may be terminated (e.g., trimmed) at or near the stripped region. In certain implementations, the strength members include a plurality of strength yarns (e.g., aramid yarn, such as Kevlar®) 182. In certain implementations, the strength members include a tensile strength member (e.g., a fiberglass rod) 183 in addition to the strength yarns 182. In other implementations, the strength members include a tensile strength member (e.g., a fiberglass rod) 183 instead of the strength yarns 182.

In some implementations, the seal blocks 120, 140 are loaded onto the optical cables 180 before the fixation assemblies 160 are coupled to the optical cables 180. For example, the fixation assemblies 160 may be sized so that a fixation assembly 160 does not fit easily through the axial passages 124, 144 defined by the seal blocks 120, 140. Indeed, some fixation assemblies 160 may not fit at all through the axial passages 124, 144 of the certain example types of seal blocks 120, 140.

In certain implementations, the optical cables 180 are routed through the passages 124, 144 of the seal blocks 120, 140 before being stripped (e.g., while the jacket 185 still covers the optical fibers 181 and strength members 182, 183). For example, an optical cable 180 may be routed axially through the passage 124 of the round-type seal block 120. In other implementations, however, an optical cable 180 may be routed radially into the passage 144 of the oblong-type seal block 140.

Figure 11:
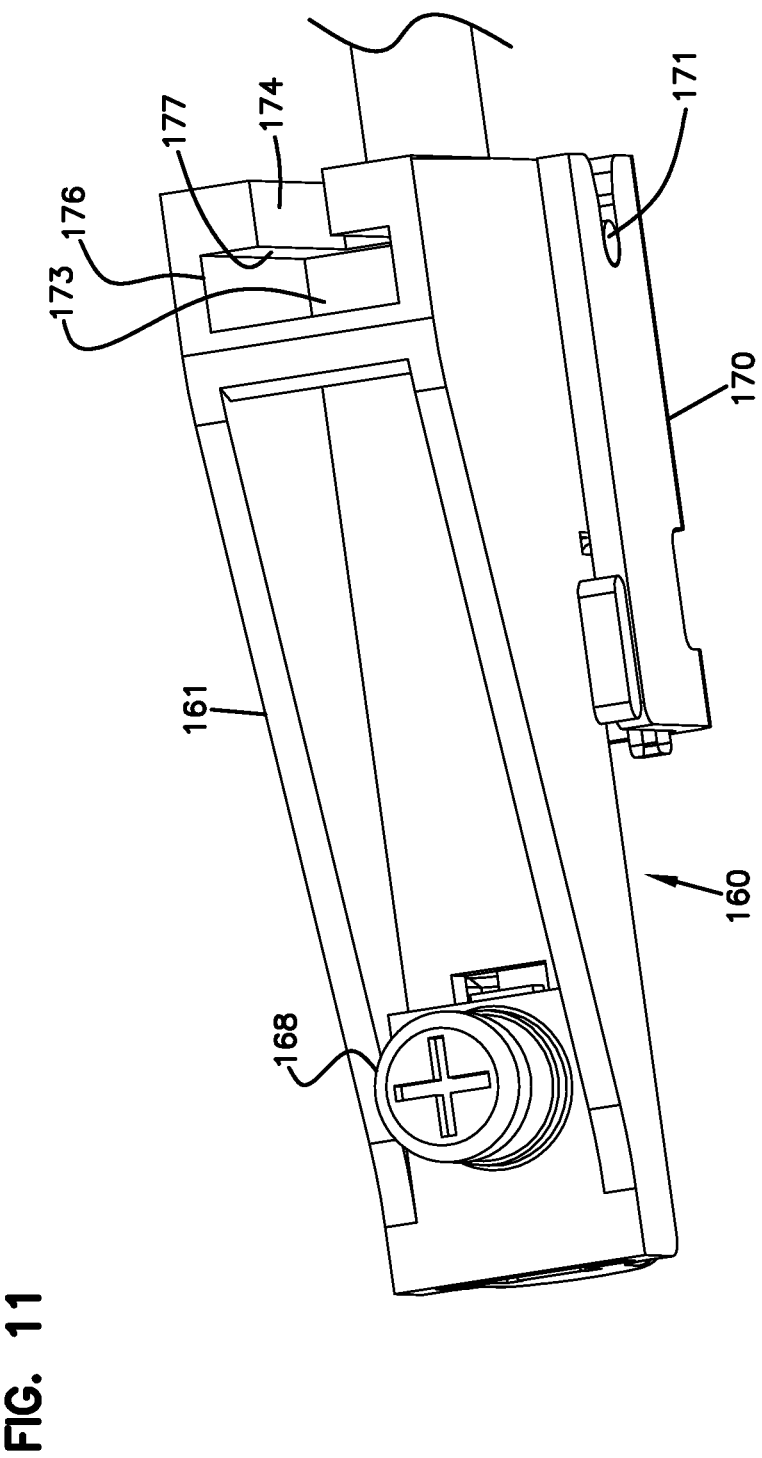
FIG. 11 is a top perspective view of the example fixation assembly of FIG. 10.
Figure 12:
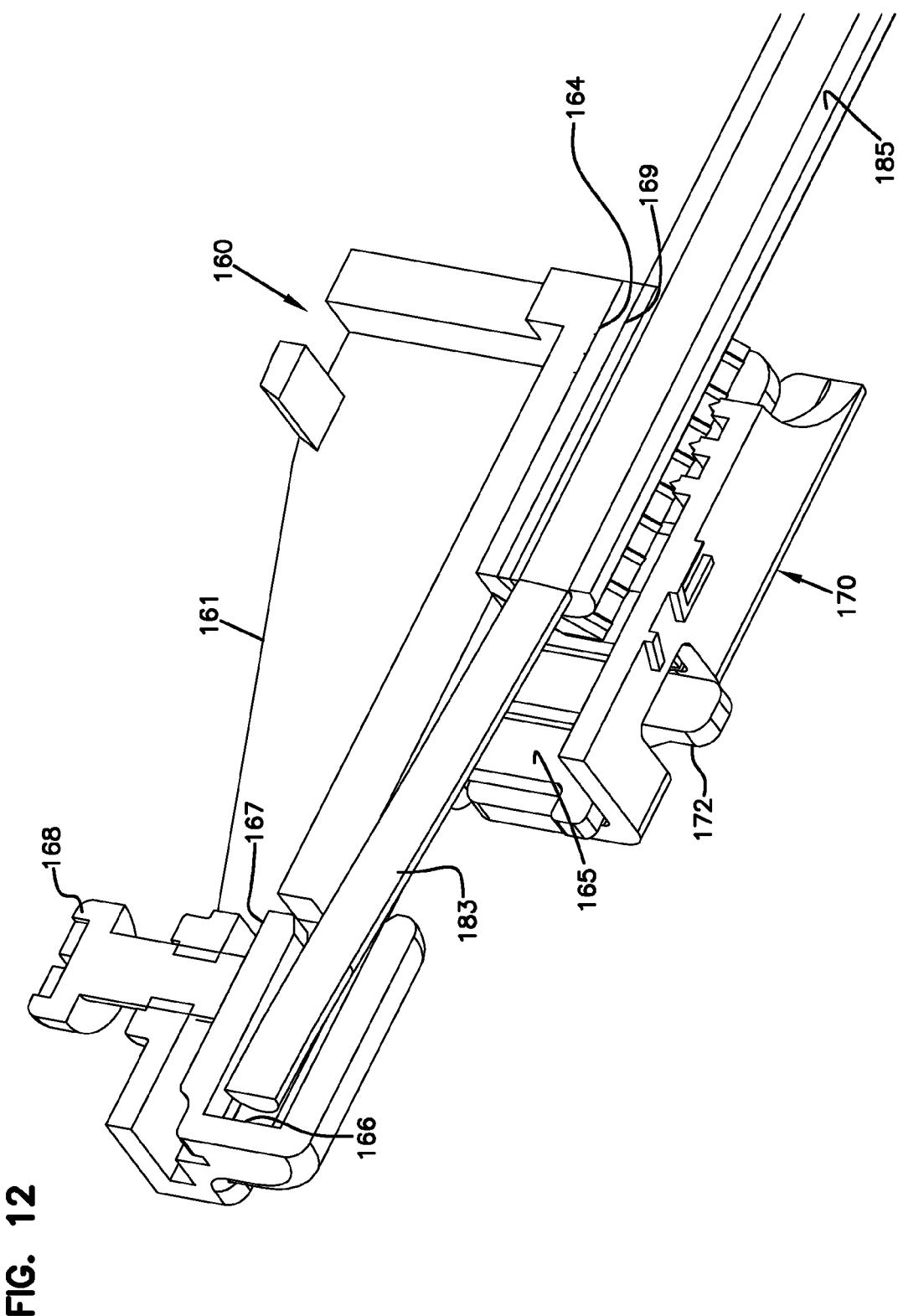
FIG. 12 is a bottom perspective view of the example fixation assembly of FIG. 10 shown along an axial cross-section.

FIGS. 10-12 illustrate one example fixation mount 160. The fixation assembly 160 includes a body 161 extending from a first end 162 to a second end 163. The body 161 defines an axial channel 164 that extends at least partially between the first and second ends 162, 163. In some implementations, the axial channel 164 has a ribbed (e.g., laterally ribbed) or otherwise textured surface. A fiber optic cable 180 may be routed along the channel 164 from the first end 162 towards the second end 163. The textured surface may aid in holding the cable 180 against axial and/or torsional strain. In certain implementations, a sizing flange 169 may be positioned in the channel 164 to accommodate various sizes of optical fiber cables 180 (i.e., optical cables having various diameters). In some such implementations, the sizing flange 169 has a ribbed (e.g., laterally ribbed) or otherwise textured surface. The textured surface of the sizing flange 169 may aid in holding the cable 180 against axial and/or torsional strain.

A cover 170 is configured to selectively mount to the body 161 to close the channel 164, thereby enclosing a portion of the fiber optic cable 180 (see FIG. 12). In certain implementations, the cover 170 is pivotally coupled to the body 161 (e.g. using hinge arrangement 171). In certain implementations, the cover 170 latches to the body 161 using latch arrangement 172. In the example shown in FIG. 10, the latch arrangement 172 includes two latching fingers extending upwardly from the body 161 adjacent the channel 164. The cover 170 may be latched to the body 161 after being pivoted to the closed position. In other implementations, the cover 170 may be otherwise secured to the body 161.

The jacket 185 of the optical cable 180 terminates at an intermediate position within the fixation body 161. The optical fibers 181 and strength members extend past the jacket 185 towards the second end 163 of the body 161. The strength members may be trimmed at a location spaced from the jacket 185. In some implementations, the jacketed cable 180 extends through the axial channel 164 of the body 161. In such implementations, the cover 170 cooperates with the channel 164 (or sizing flange 169) to enclose the jacketed portion of the cable 180. In certain implementations, the cover 170 and the channel 164 (or sizing flange 169) cooperate to radially compress the jacketed portion of the cable 180.

The fixation assemblies 160 are configured to retain the strength members of the optical fiber cables 180. In some implementations, the cable fixation body 161 includes a winding arrangement 165 at which the strength yarns 182 may be wound or otherwise retained. In the example shown, the winding arrangement 165 includes four L-shaped flanges that extend upwardly from the fixation body 161 (see FIG. 10). In various implementations, the strength yarns may be wound around the flanges in a variety of configurations (e.g., an X-pattern, an L-pattern, or an O-pattern). In other implementations, the winding arrangement 165 may have a greater or lesser number of flanges or have flanges of different shapes.

In some implementations, the fixation body 161 includes an enclosing structure defining a first pocket 166 at which the tensile strength member 183 may be retained. The first pocket 166 is located at the second end 163 of the body 161. In some implementations, the first pocket 166 is axially aligned with the channel 164 of the body 161. In other implementations, the first pocket 166 is radially offset from the channel 164 (e.g., see FIG. 12) so that the tensile strength member 183 flexes radially away from the channel 164 when routed to the first pocket 166. The first pocket 166 is sized to receive the tensile strength member 183 and still allow the optical fibers 181 to extend past the first pocket 166 (see FIG. 13).

The pocket 166 is defined at least partially by a flexible flange 167 that is configured to flex selectively into the pocket 166. In certain implementations, a tightening member 168 is configured to apply a force to the flange 167 that directs the flange 167 into the first pocket 166. The force may be increased to move the flange 167 into the first pocket 166 and decreased to allow the flange 167 to move out of (or to extend flush with) the first pocket 166. In the example shown, the tightening member 168 includes a set screw 168 that is mounted at a screw hole located above the flange 167.

The flexible flange 167 radially compresses the strength member 183 to aid in retaining the strength member 183 in the first pocket 166. By applying the inward force with the flange 167 instead of the tightening member 168, itself, the radial compression is spread out along a greater surface area of the strength member 183, decreasing the chances of crushing or breaking the strength member 183.

The flexible flange 167 and tightening member 168 of the fixation device 160 cooperate to accommodate tensile strength members 183 of various sizes. To accommodate a tensile strength member 183 having a small diameter, the tightening member 168 is screwed or otherwise moved towards the flange 167 to press the flange 167 into the first pocket 166. To accommodate a tensile strength member 183 having a larger diameter, the tightening member 168 is unscrewed or otherwise moved away from the flange 167, thereby allowing the flange 167 to unflex and bend away from the first pocket 166.

The fixation mount bodies 161 also are configured to secure to the interior of the base 100. In some implementations, the fixation assemblies 160 are coupled to the fiber optic cables 180 before routing the cables 180 through the ports 109. In such implementations, the fixation bodies 161 and stripped regions of the optical cables 180 are routed through the ducts 110 from an exterior of the base 100 into the interior 105 of the base 100. In other implementations, however, the fixation assemblies 160 may be coupled to the optical cables 180 after the cables 180 are routed through the ports 109.

Figure 13:
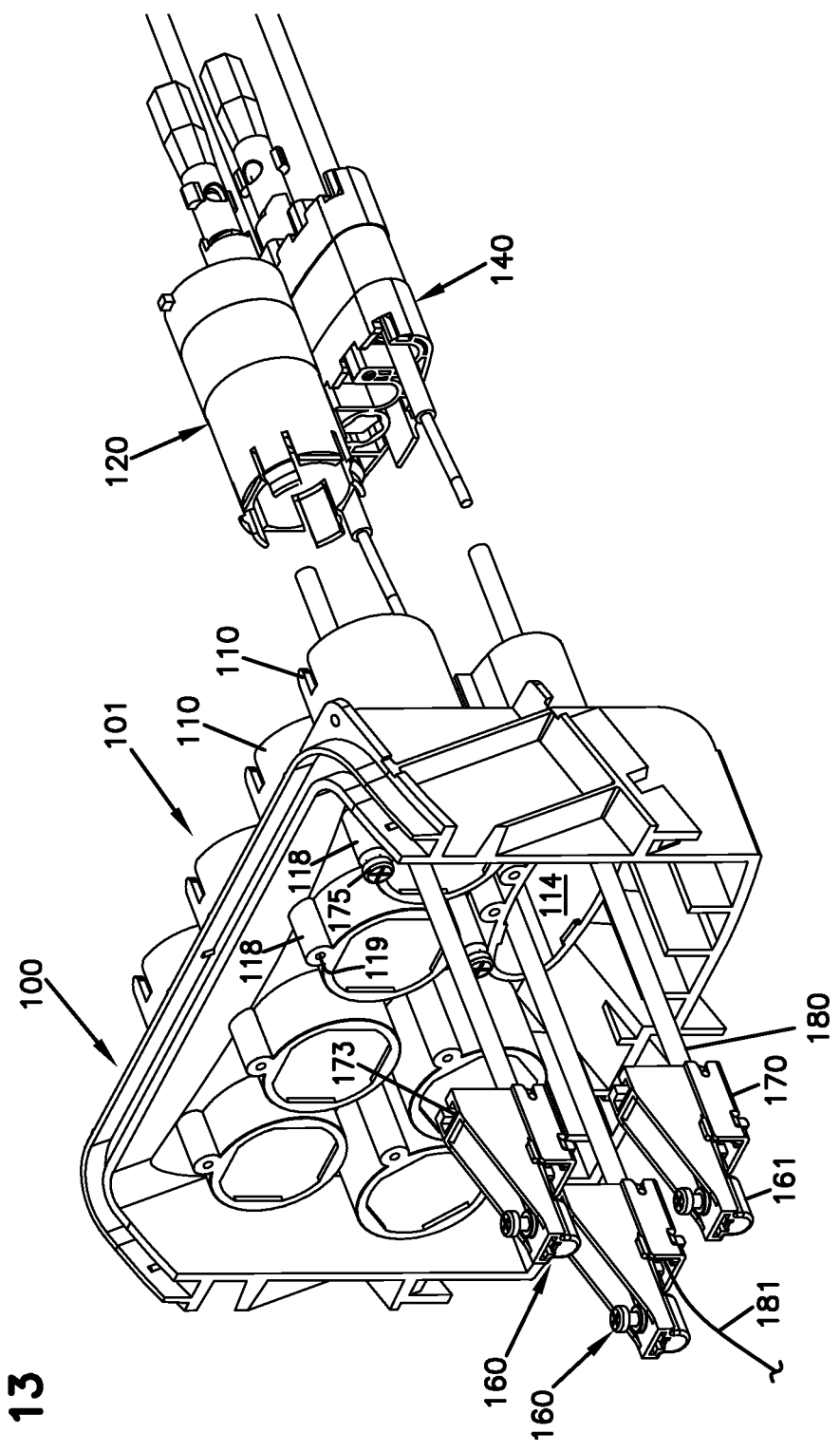
FIG. 13 is a top, rear perspective view of the first end of the base with fixation assemblies exploded away from the ports towards an interior of the base and seal block assemblies exploded away from the ports towards an exterior of the base.

As shown in FIG. 13, one or more fastener supports 118 are disposed at the inner ends 113 of the ducts 110. Each fastener support 118 defines a fastener hole 119 accessible from the interior 105 of the base 100. Each fastener hole 119 is located outside of a perimeter of the axial passage 114 extending through the respective duct 110 (e.g., see FIGS. 8 and 9). A mounting member 175 is secured in each fastener hole 119 at which a fixation assembly 160 is to be secured. In the example shown, the mounting member 175 includes a screw. In some implementations, mounting members 175 may be preinstalled in one or more of the fasteners holes 119 in the factory or other manufacturing facility. In other implementations, the mounting members 175 may be added during the installation of the cables1 180 to be secured.

Figure 14:
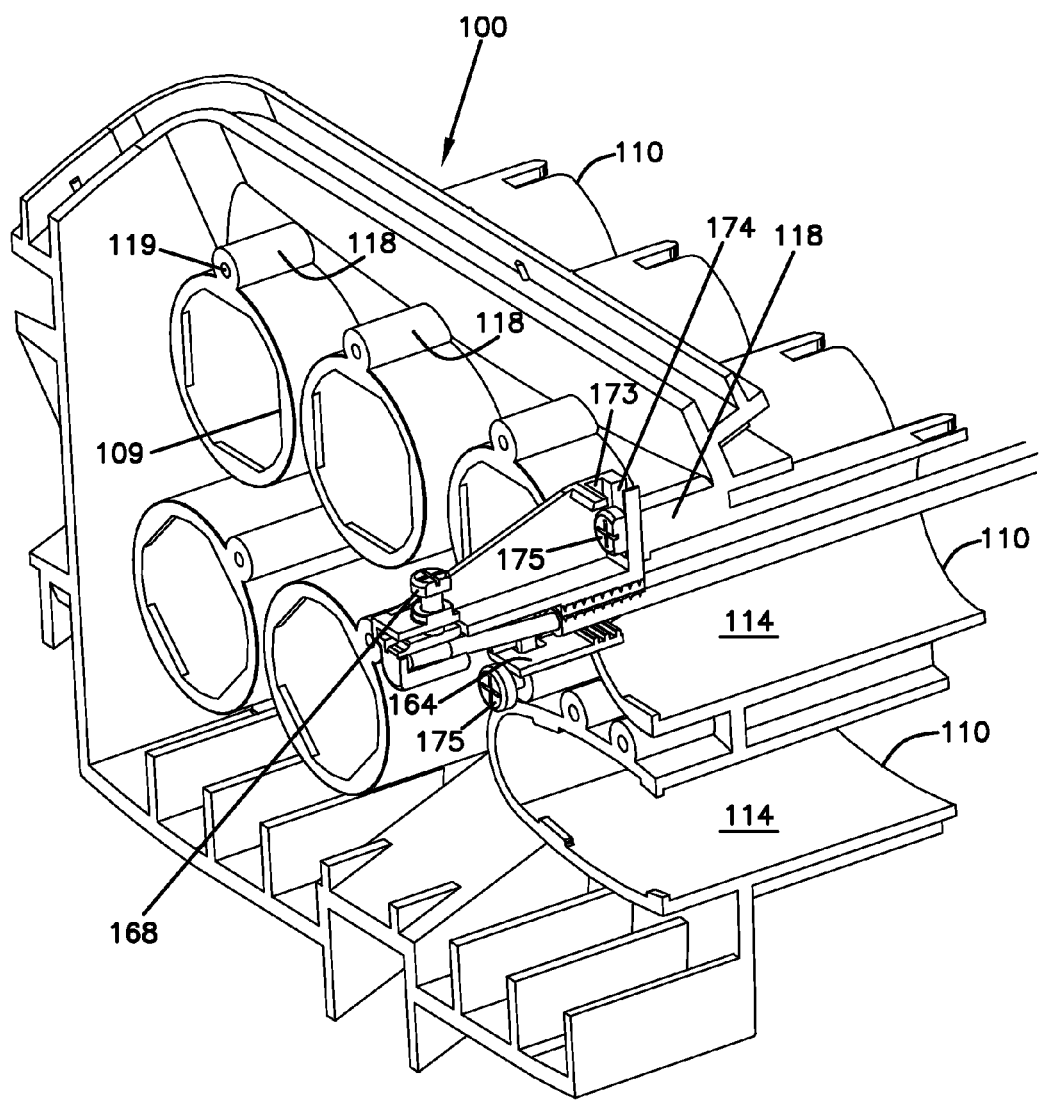
FIG. 14 is a top, rear perspective view of the first end of the base with a side portion of the base hidden to reveal a cross-section of two cable ports and a fixation assembly mounted at one of the two cable ports.

As shown in FIG. 14, the body 161 of each fastening assembly 160 defines a second pocket 173 at the first end 162 of the body 161. To secure the fixation assembly 160 to the base 100, the fixation assembly 160 is positioned so that the mounting member 175 is disposed within the second pocket 173. For example, the fixation assembly 160 may be moved laterally relative to the ports 109 to slide the mounting member 175 into the second pocket 173. The mounting member 175 may be tightened to clamp the fixation assembly 160 between the screw head and the fastener support 118, thereby axially securing the fixation assembly 160 to the base 100.

As shown in FIG. 11, the second pocket 173 is sized to accommodate the head of the mounting screw 175. The second pocket 173 has an open face 176 that extends generally parallel to the channel 164 of the fixation body 161. The open face 176 is sized to enable the head of the mounting screw 175 to pass into the second pocket 173. The fixation body 161 also defines a slot 174 extending through a wall defining the second pocket 173. The slot 174 is sized to enable the body of the screw 175 to extend therethrough. In the example shown, the slot 174 and the open face 176 define a T-shaped profile. An inner surface of the second pocket 173 forms shoulders 177 at opposite sides of the slot 174. When the mounting member 175 is tightened, the head of the mounting member 175 axially compresses against the shoulders 177 (see FIG. 14).

Figure 15:
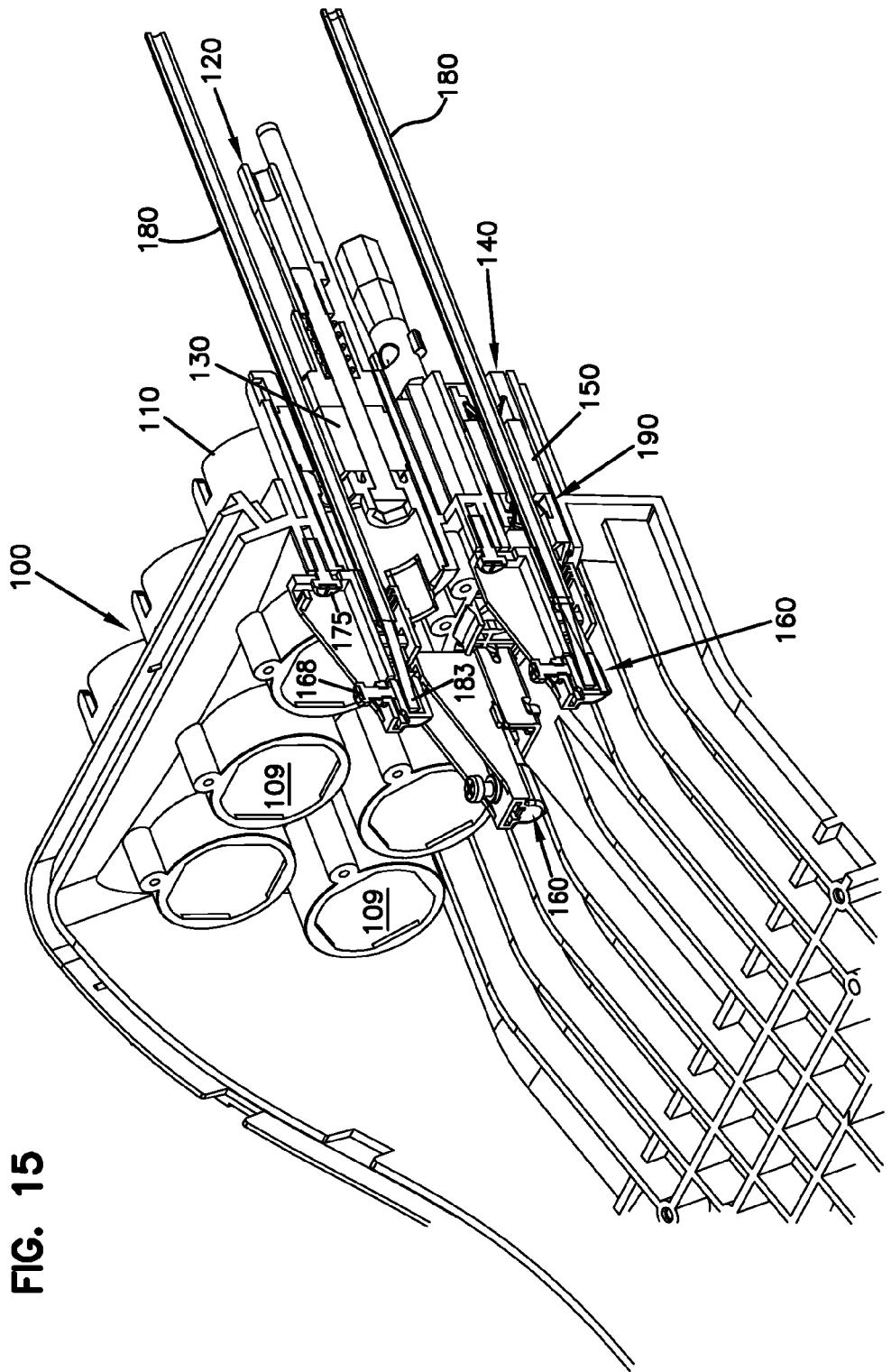
FIG. 15 is a top, rear perspective view of a portion of the base with three cable port assemblies mounted at the first end with a side portion of the base hidden to reveal an axial cross-section of two of the cable port assemblies.

When coupled to the cables 180, the seal block assemblies 120, 140 and the fixation assemblies 160 cooperate to form cable port assemblies 190 (FIG. 15). In some implementations, the seal blocks 120, 140 are slid into the ducts 110 to seal the cable ports 109 after the fixation assemblies 160 are secured to the first end 101 of the base 100. In other implementations, the seal blocks 120, 140 may be slid into the ducts 110 after the fixation assemblies 160 are routed through the ducts 110, but before the fixation assemblies 160 are secured to the base 100.

In the example shown in FIGS. 16-34, an alternative first seal block assembly 220 is disposed within one of the ducts 110 at one of the cable ports 109, and a an alternative second seal block 340 is disposed within another one of the ducts 110 at the cable ports. A complete enclosure 200 is shown with a base 204, a cover 206, and latches 208 The first seal block assembly 220 is configured to fit within one of the round cable ports 109. The second seal block assembly 340 is configured to fit within one of the oblong cable ports 109. Note the oblong port 109 in FIGS. 16-20 is 90 degrees from the position shown in FIGS. 1-15. Such a rotated position assists with cable management of loop cables, such as for storage in a hinged tray. Oblong port 109 is particularly useful for loop cables.

The first seal block assembly 220 includes a body 221 extending from a first end 222 to a second end 223. Two axial passages 224 (FIG. 26) extend through the body 221 from the first end 222 to the second end 223. One or more optical fiber cables 180 may be routed through each of the axial passages 224. The axial passages 224 extend in separate halves 290 which can be used separately and accessed separately.

One or more stop surfaces (e.g., shoulders, notches, lips, etc.) 245 are disposed at the first end 222 of the body 221. In some implementations, the stop surfaces 245 are formed by the edge of the first end 222 of the seal block assembly 220.

The seal block assembly body 221 also includes a latching arrangement to secure the body 221 at the cable port 109. In the example shown, the latching arrangement includes one or more flexible fingers 226 at the first end 222 of the body 221. A ramp 227 and a shoulder 228 are disposed on an external surface of each flexible finger 226. In the example shown, two latching fingers 226 extend from circumferentially spaced locations at the first end 222 of the body 221. In other implementations, however, the body 221 may have a greater or lesser number of latching fingers 226. A groove 240 and a c-clip 242 secure seal block assembly 220 to cable port 109.

The seal block body 221 is configured to seal a cable port 109 when plugged into the cable port 109. In the example shown, the seal block body 221 includes a gasket 230 (e.g., a gel structure, a foam structure, a rubber structure, etc.) sandwiched between a first body portion and a second body portion. In the example shown, the first body portion includes an integral body piece 231 and the second body portion includes a second integral body piece 232. Body piece 231 holds halves 290. An activation assembly 233 holds the body pieces 231, 232 together and selectively axially compresses the gasket 130 therebetween to activate the seal.

Figure 26:
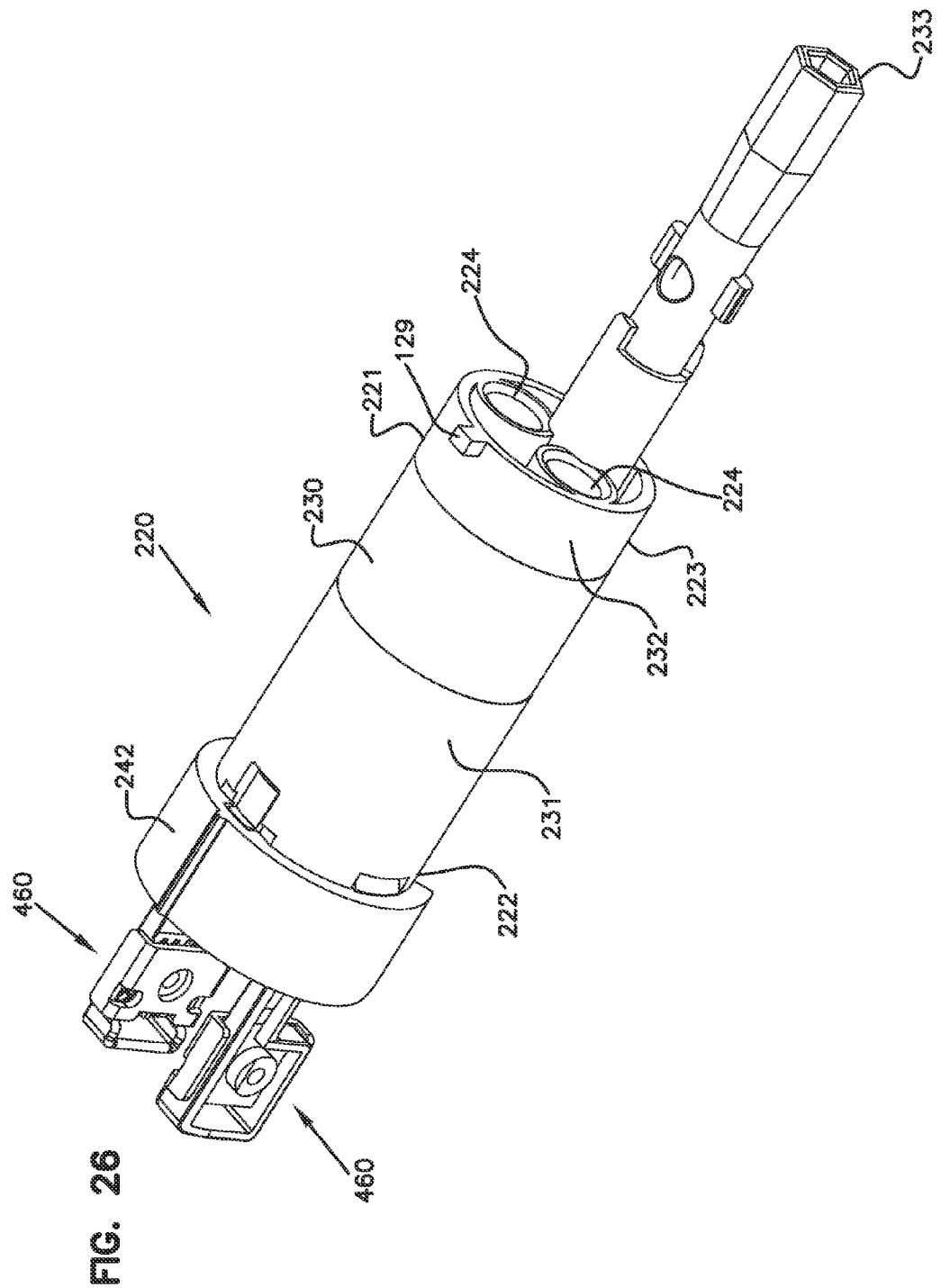
FIG. 26 is a perspective view of an example round-type seal block assembly in the enclosure of FIGS. 16 and 17.
Figure 27:
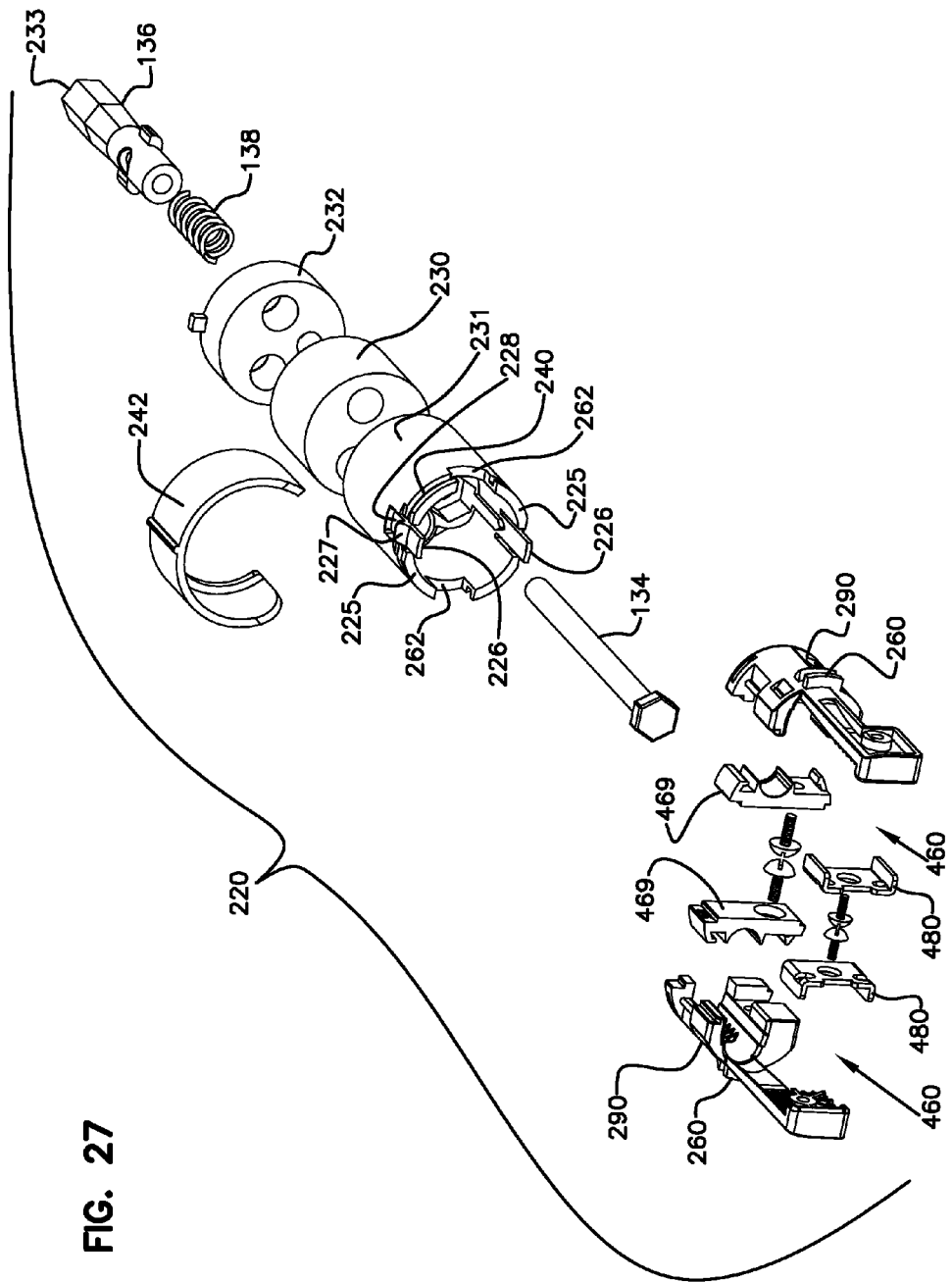
FIGS. 27 and 28 are exploded views of the example round-type seal block assembly of FIG. 26.
Figure 28:
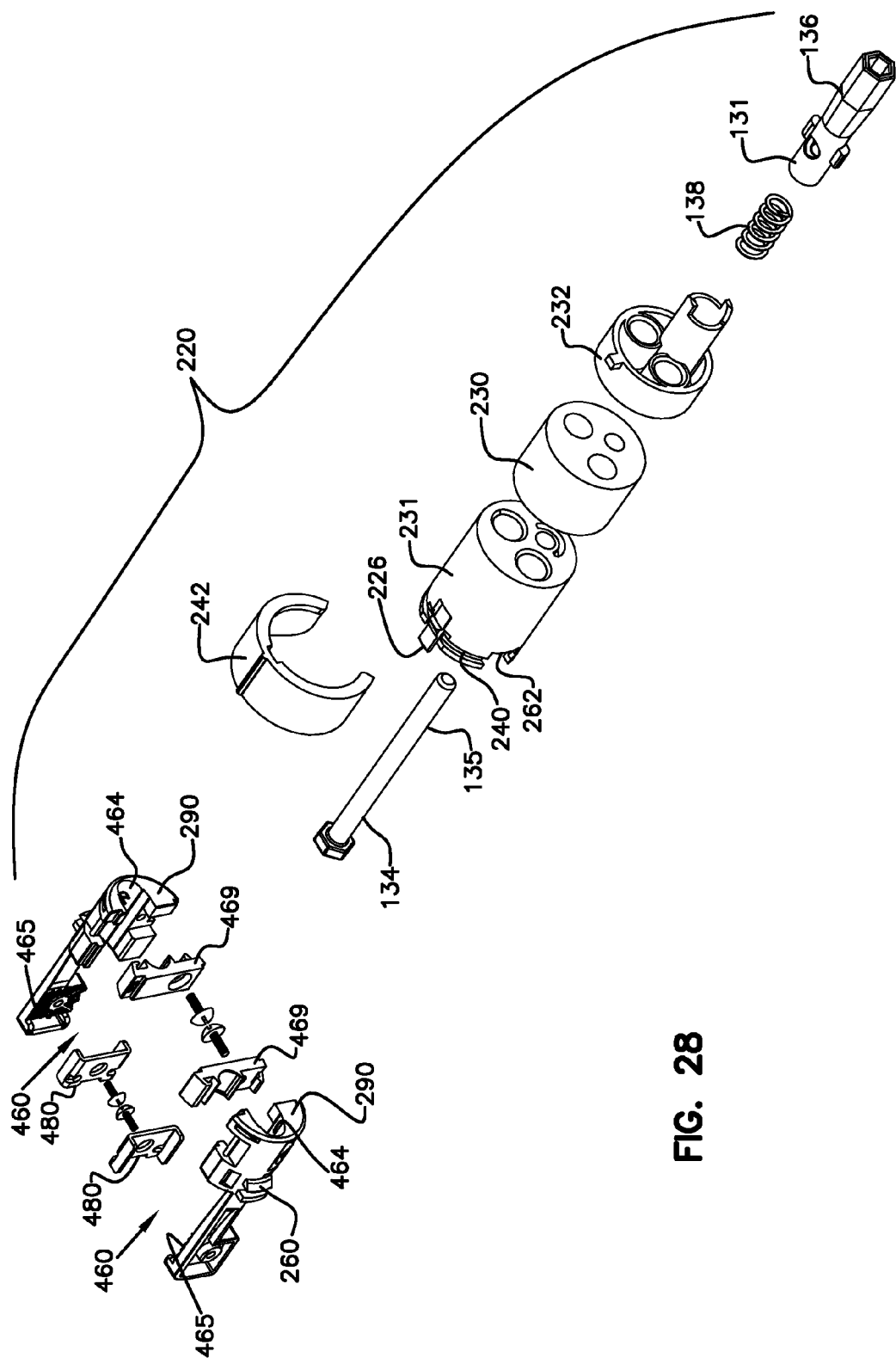
Figure 29:
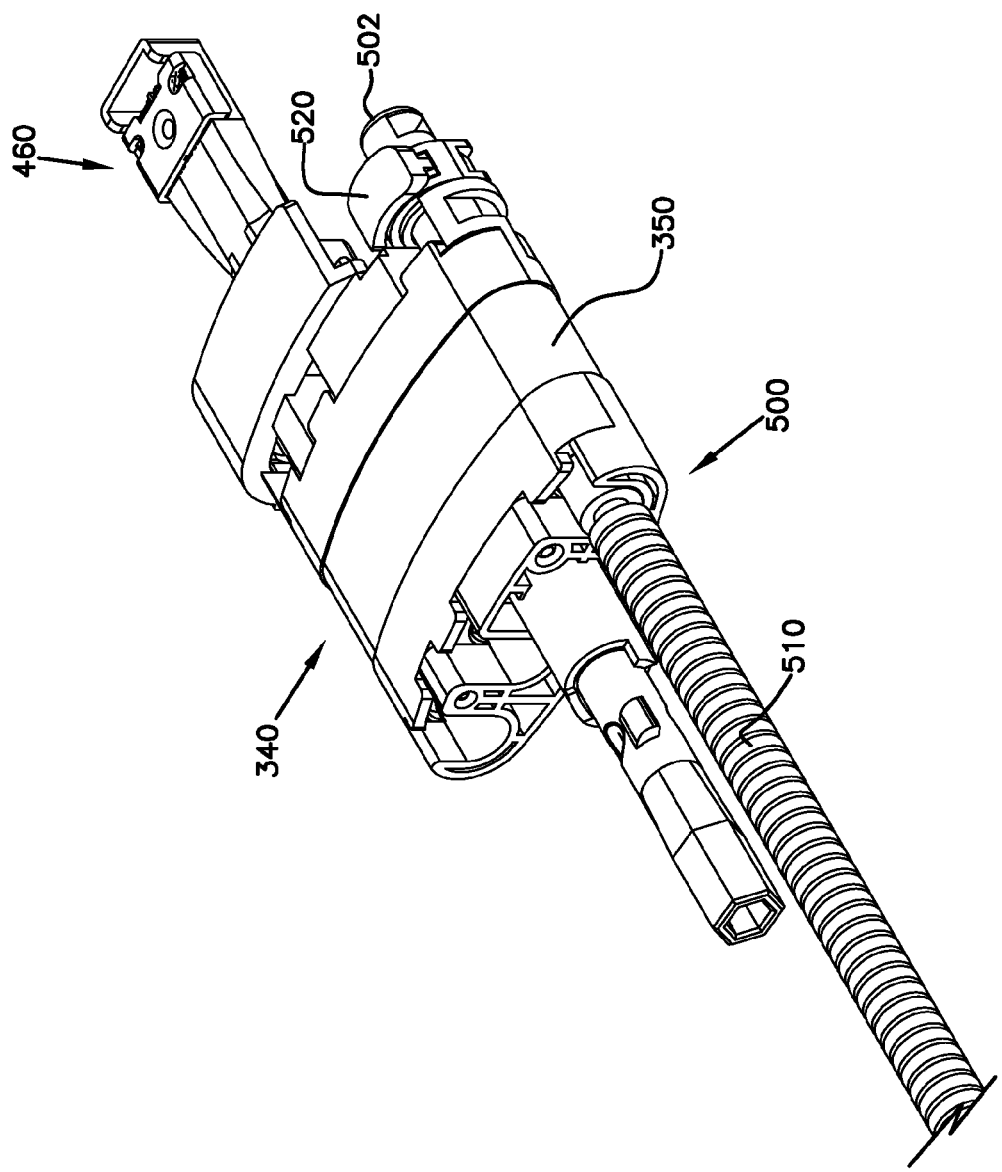
FIG. 29 is a perspective view of the example oblong-type seal block assembly in the enclosure of FIGS. 16 and 17, showing the method of adding a new tube through the seal block.
Figure 30:
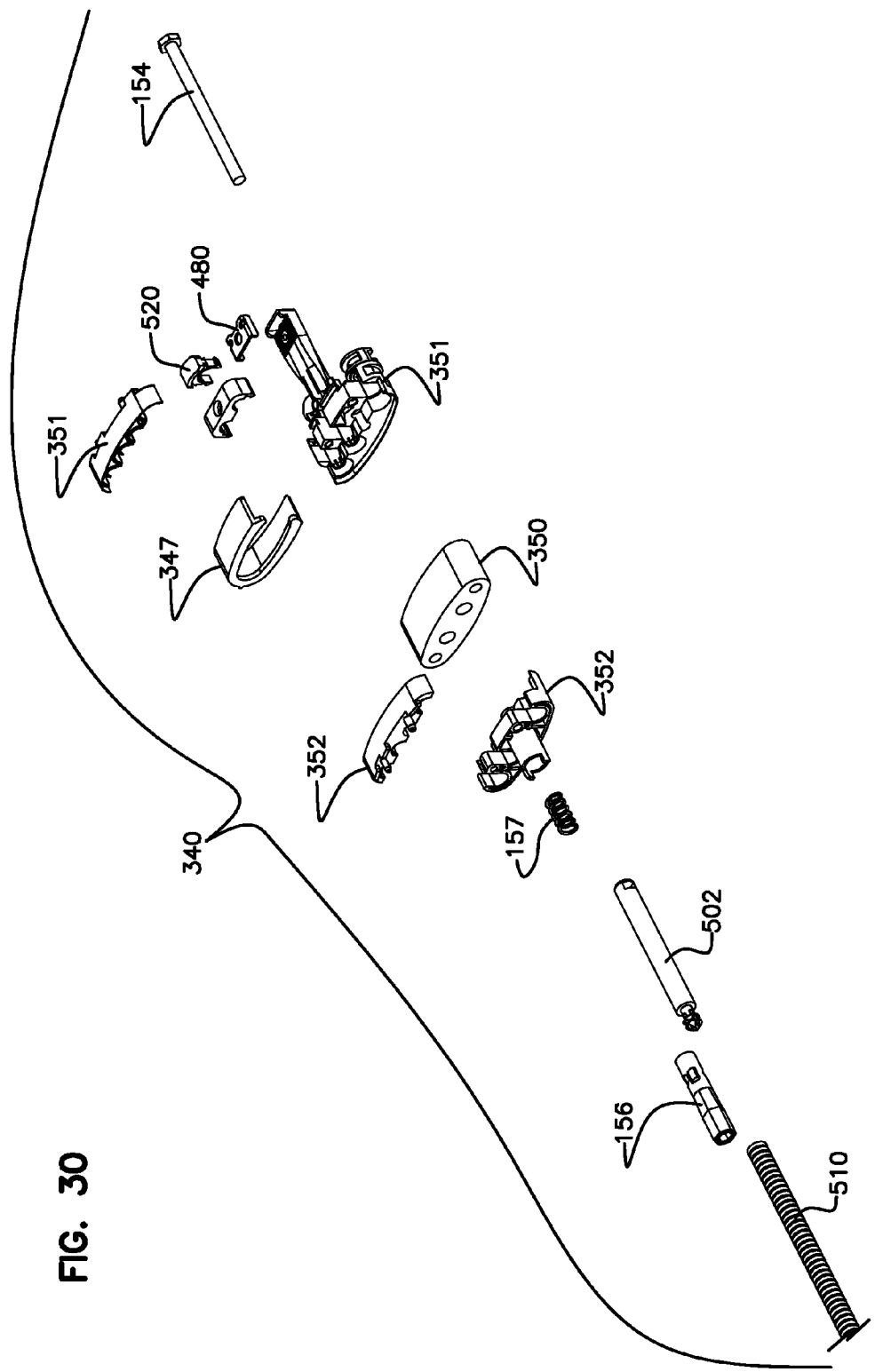
FIG. 30 is an exploded view of the example oblong-type seal block assembly and method of FIG. 29.
Figure 31:
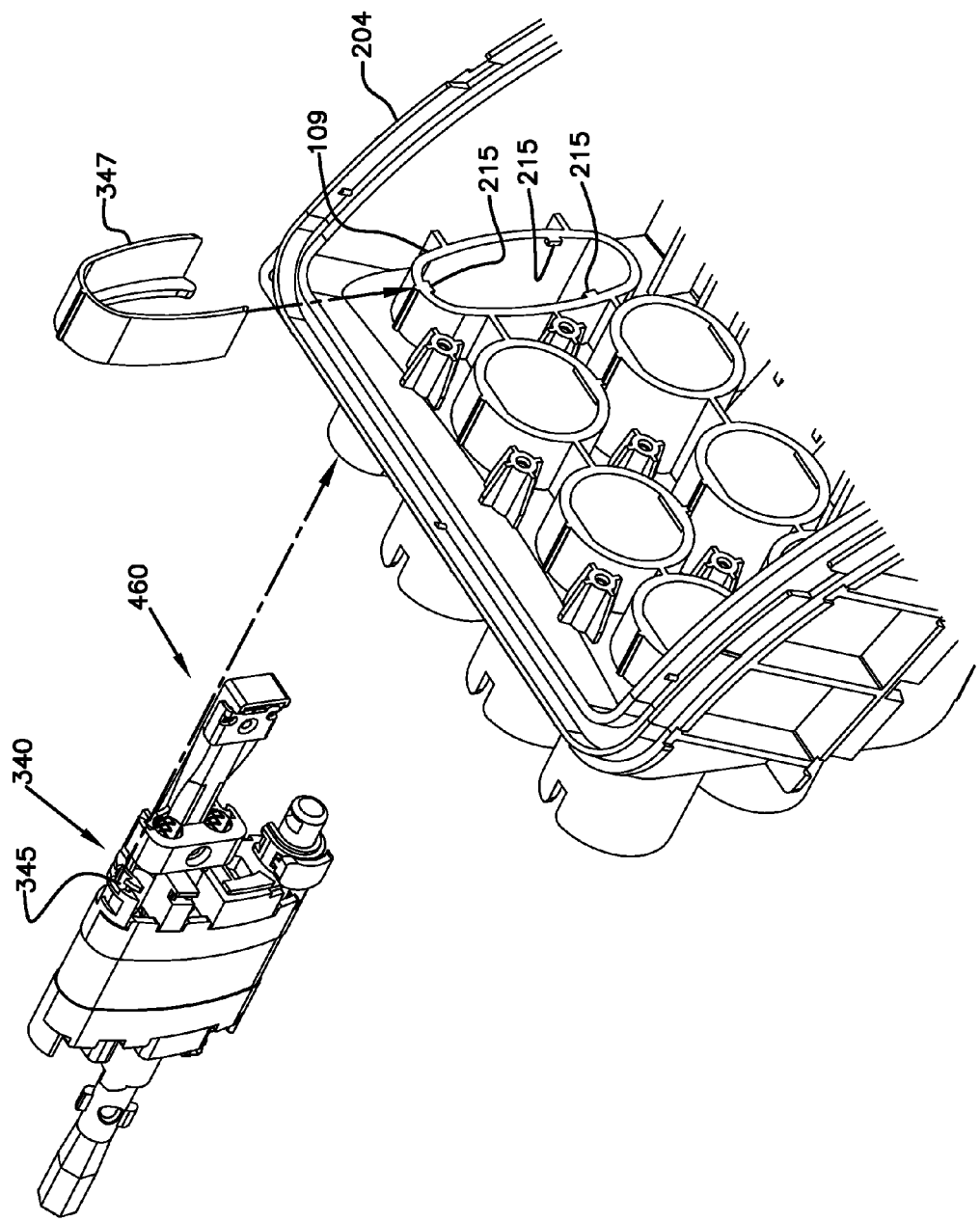
FIGS. 31 and 32 show the oblong-type seal block assembly being mounted to the enclosure.
Figure 32:
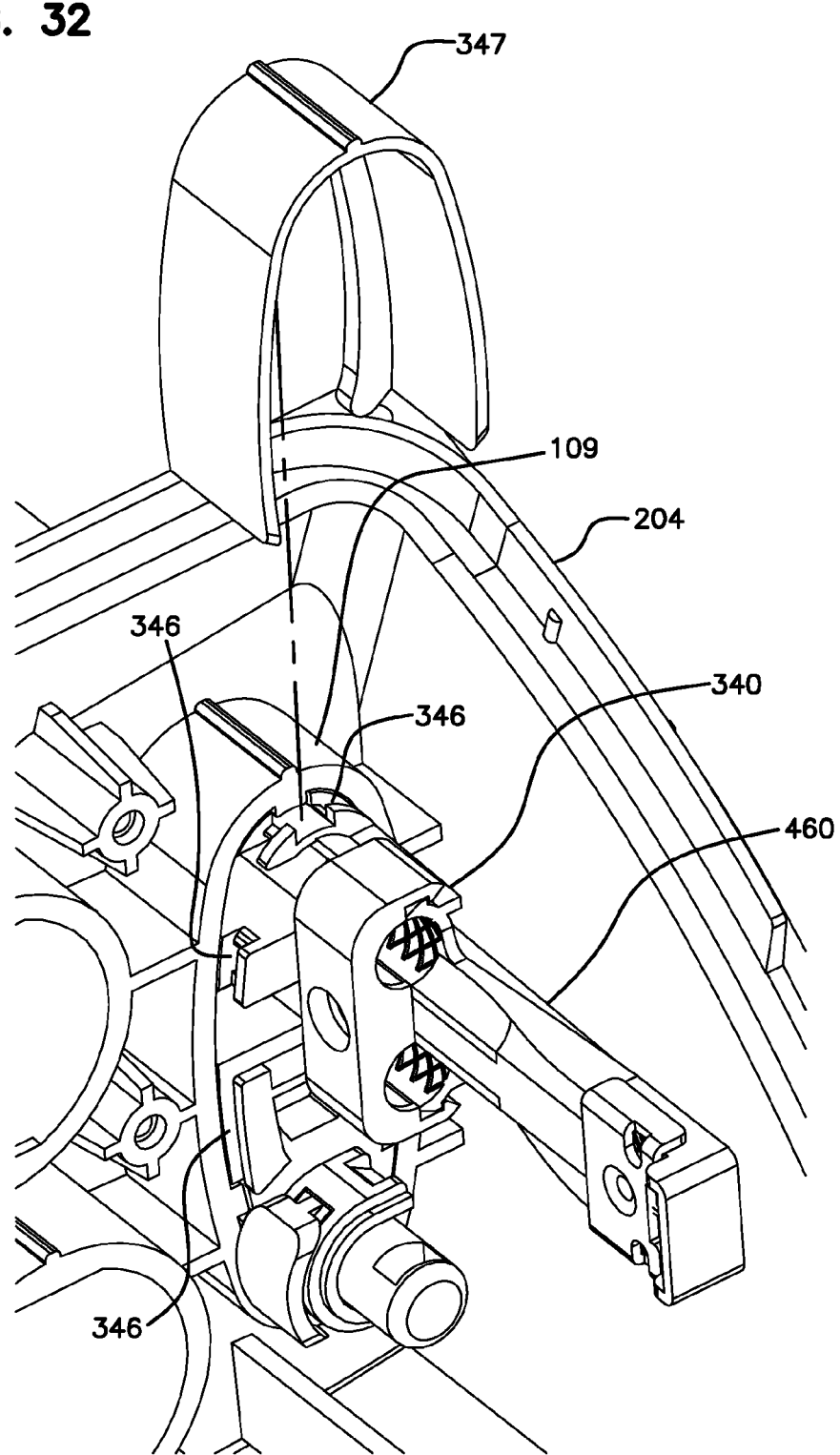
Figure 33:
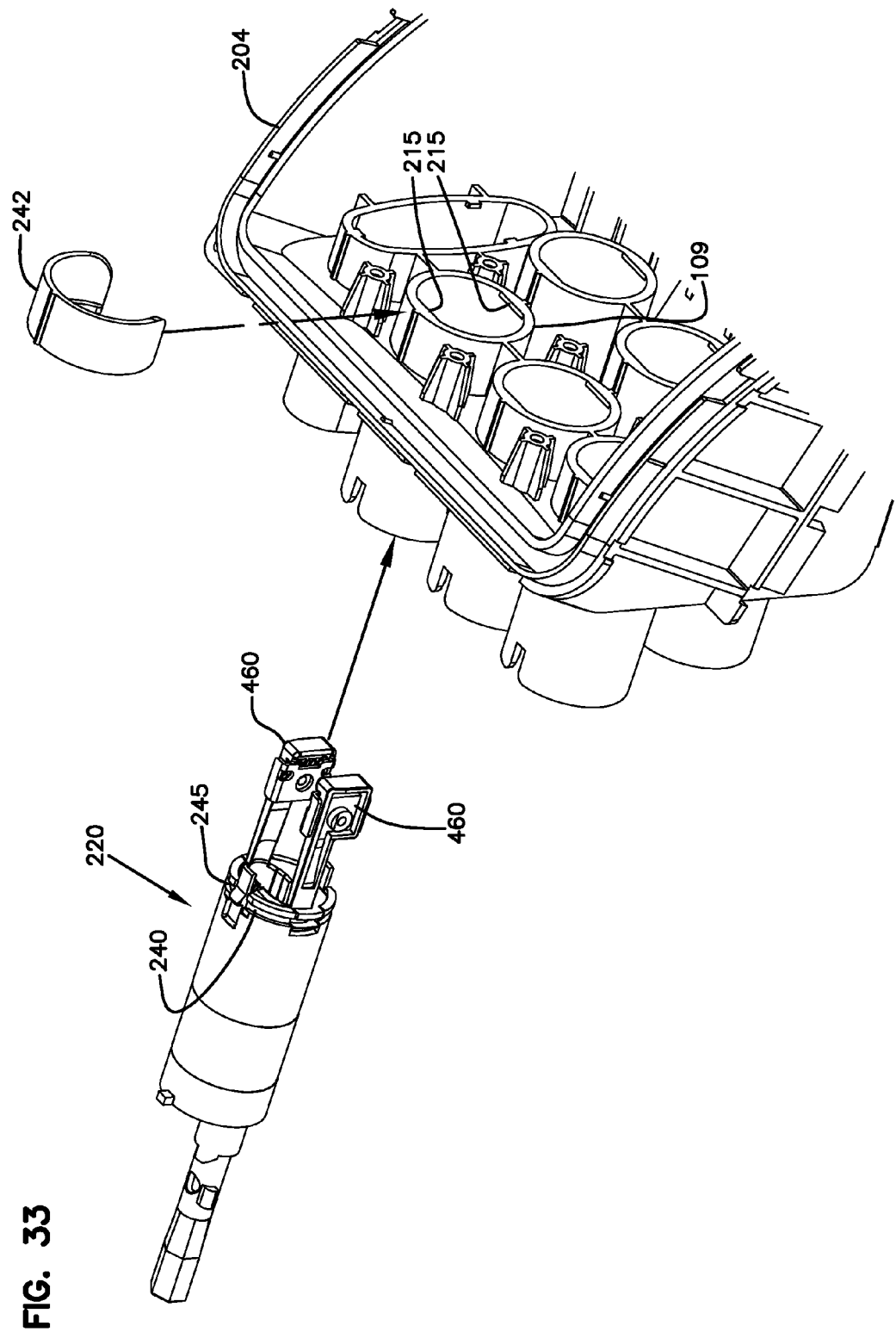
FIGS. 33 and 34 show the round-type seal block assembly being mounted to the enclosure.
Figure 34:
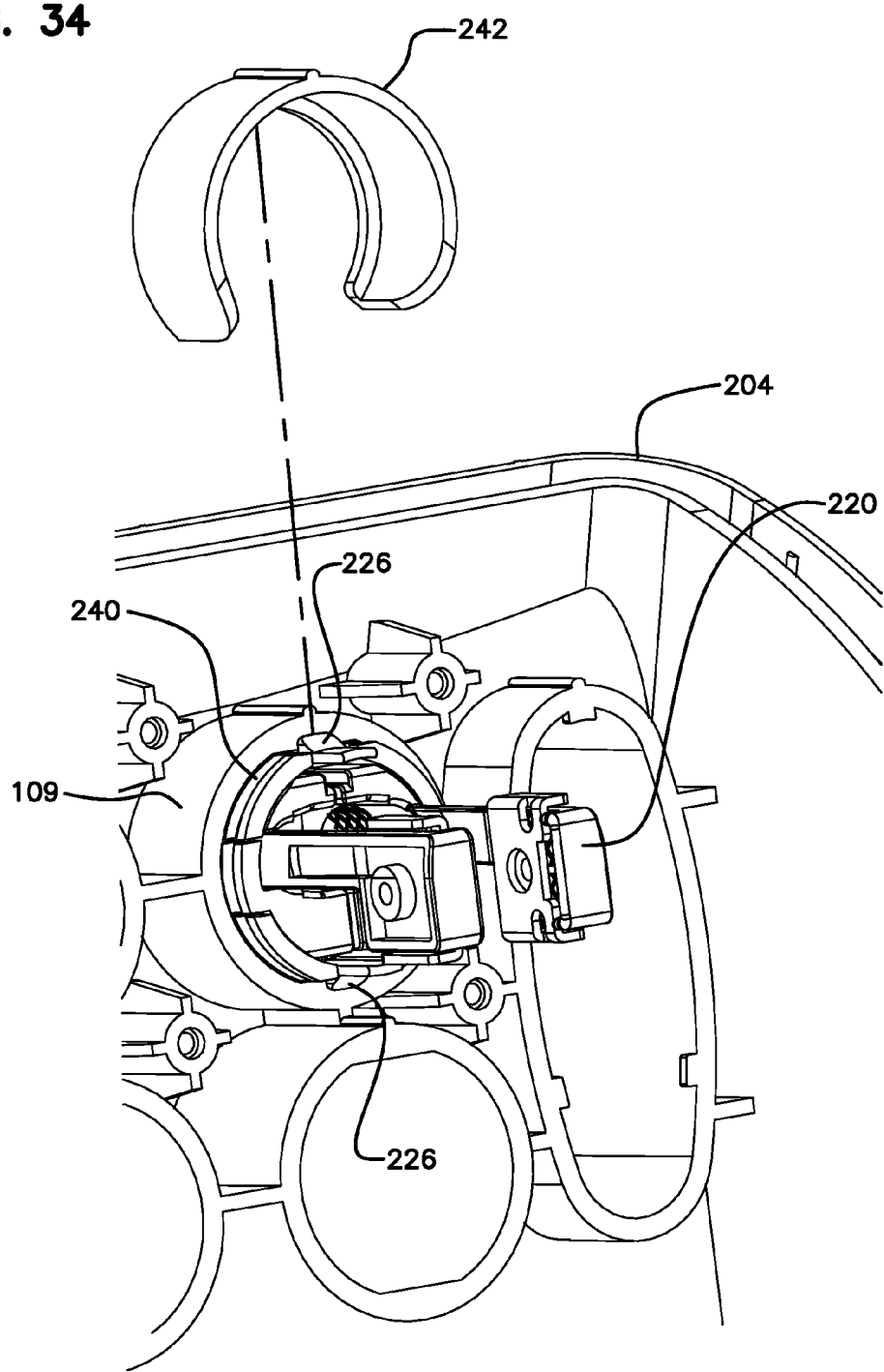

In the example shown in FIGS. 26 and 27, the activation assembly 233 includes a screw 134 having a threaded region 135, a grip 136 having a threaded region 137, and a spring 138. The screw 134 extends axially through the gasket 130. A first end of the screw 134 is secured to the first body piece 231 and a second end of the screw 134 protrudes from the second body piece 232. The threaded region 137 of the grip 136 cooperates with the threaded region 135 of the screw 134 to telescopically mount the grip 136 to the second end of the screw 134. The spring 138 is mounted over the screw 134 so that tightening the grip 136 on the screw 134 compresses the spring 138. As the spring 138 is compressed, the spring 138 exerts a greater axial bias on the gasket 130 (see FIG. 5).

Halves 290 are held inside body piece 231 by stops 215 in port 109. Halves 290 also define cable fixture structures as will be defined in more detail below. First seal block assembly 220 allows for seal assembly on the cable 180 and fixation to the strength member or members outside of enclosure 200, and the unit can be inserted into port 109. At that point the seal can be activated. Halves 290 include tabs 260 which fit into notches 262 of body piece 231.

A second seal block assembly 340 is disposed within another of the ducts 110 at one of the cable ports 109. The second seal block assembly 340 is configured to fit within the oblong cable port 109. The second seal block assembly 340 includes a body 341 extending from a first end 342 to a second end 343. One or more axial passages 344 (FIGS. 20-22) extend through the body 341 from the first end 342 to the second end 343. One or more optical fiber cables 180 may be routed through each of the axial passage 344. In the example shown, a first axial passage 344a extends along a first side of the body 341, a second axial passage 344b extends along an intermediate region of the body 341, and a third axial passage 344c extends along a second side of the body 341 opposite the first side. In other implementations however, the body 341 may include a greater or lesser number of axial passages 344 or may have a different configuration of axial passages.

The first end 342 of the body 341 defines a first stop surface 345. The seal block assembly body 341 also includes a securing arrangement to secure the body 341 at the respective cable port 109. In the example shown, the securing arrangement includes one or more grooves 346 at the first end 342 of the body 341. A clip 347 fits into groove 346.

The seal block body 341 is configured to seal a cable port 109 when plugged into the respective duct 110. In the example shown, the seal block body 341 includes a gasket 350 (e.g., a gel structure, a foam structure, a rubber structure, etc.) sandwiched between a first body portion and a second body portion. In the example shown, the first body portion includes a first body assembly 351 and the second body portion includes a second body assembly 352. In certain implementations, each of the body assemblies 351, 352 include two or more sections that cooperate to define the axial passages 344. The sections of the body assemblies 351, 352 may be separated to load the fiber optic cables within the body assemblies 351, 352 (e.g., see FIG. 7).

An activation assembly 353 holds the body assemblies 351, 352 together and selectively axially compresses the gasket 350 therebetween to activate the seal. In the example shown in FIG. 7, the activation assembly 353 includes a screw 154 having a threaded region 155, a grip 156 having a threaded region 157, and a spring 158. The screw 154 extends axially through the gasket 150. A first end of the screw 154 is secured to the first body assembly 351 and a second end of the screw 154 protrudes from the second body assembly 352. The threaded region 157 of the grip 156 cooperates with the threaded region 155 of the screw 154 to telescopically mount the grip 156 to the second end of the screw 154. The spring 158 is mounted over the screw 154 so that tightening the grip 156 on the screw 154 compresses the spring 158. As the spring 158 is compressed, the spring 158 exerts a greater axial bias on the gasket 350 (see FIG. 7).

Figure 19:
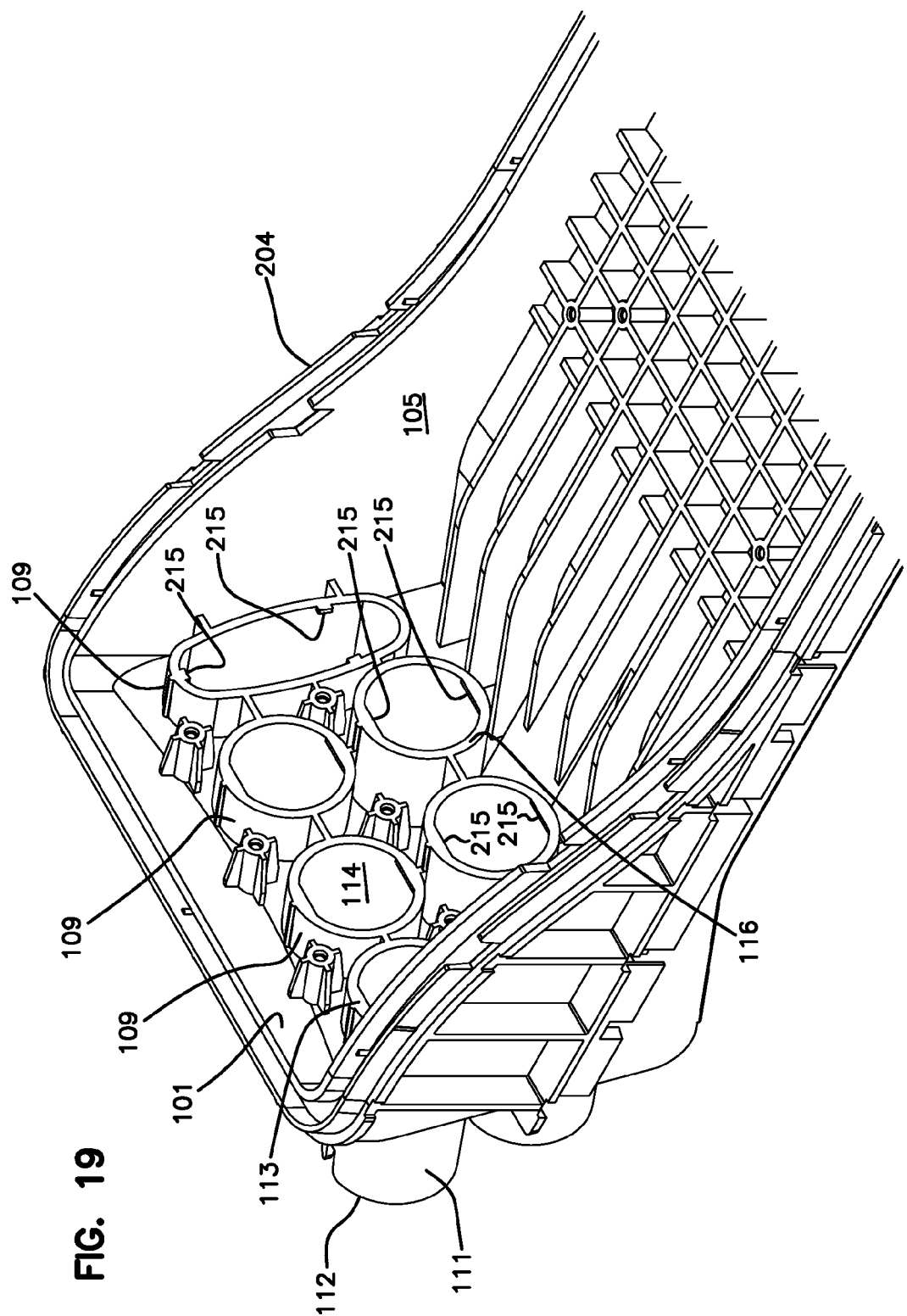
FIG. 19 is a perspective view of a portion of the base of the enclosure of FIGS. 16 and 17 from an interior position.

FIG. 19 illustrates the front end 101 of the enclosure base 204 from the interior 105 of the base 100. As noted above, the first end 101 defines multiple ports 109 leading into the interior 105 of the base 100. First axial passage 344a is adjacent to second axial passage 344b for receipt of a loop cable. Third axial passage 344c is for later use and can be initially plugged. Third axial passage 344c can be used to later add a repair cable should to loop cable become damaged or more capacity is needed. In the example enclosure 200 shown, the first end 101 defines a first row of round ports 109 and a second row of round and oblong ports 109. In other implementations, the ports 109 may by arranged in any desired configuration.

In the example enclosure shown, the ports 109 are defined by ducts 110 extending into and out of the base 100. Each duct 110 includes an elongated body 111 extending from an outer end 112 to an inner end 113. Each elongated body 111 defines an axial passage 114 extending from the outer end 112 to the inner end 113. The inner end 113 of the elongated body 111 defines a shoulder 116 that faces the interior 105 of the base 100. In the example shown, the shoulder 116 extends around the circumference of the inner end 113. In other implementations, however, the shoulder 116 may be broken/interrupted along the circumference.

One or more stops 215 are disposed at the inner end 113 of the elongated body 111 and extend into the passage 114. In the example shown, two circumferentially spaced stops 215 extend inwardly at the inner end 113 of each round elongated body 111. In other implementations, however, a greater or lesser number of stops 215 may extend inwardly from the elongated body 111. Three stops 215 are provided for the oblong elongated body. In certain implementations, one or more of the elongated bodies 111 may define one or more slots 117 at the outer end 112 of the elongated body 111. In the example shown, the outer end 112 defines a single slot that is useful for aligning the seal block assembly 120 at the duct 110.

Figure 16:
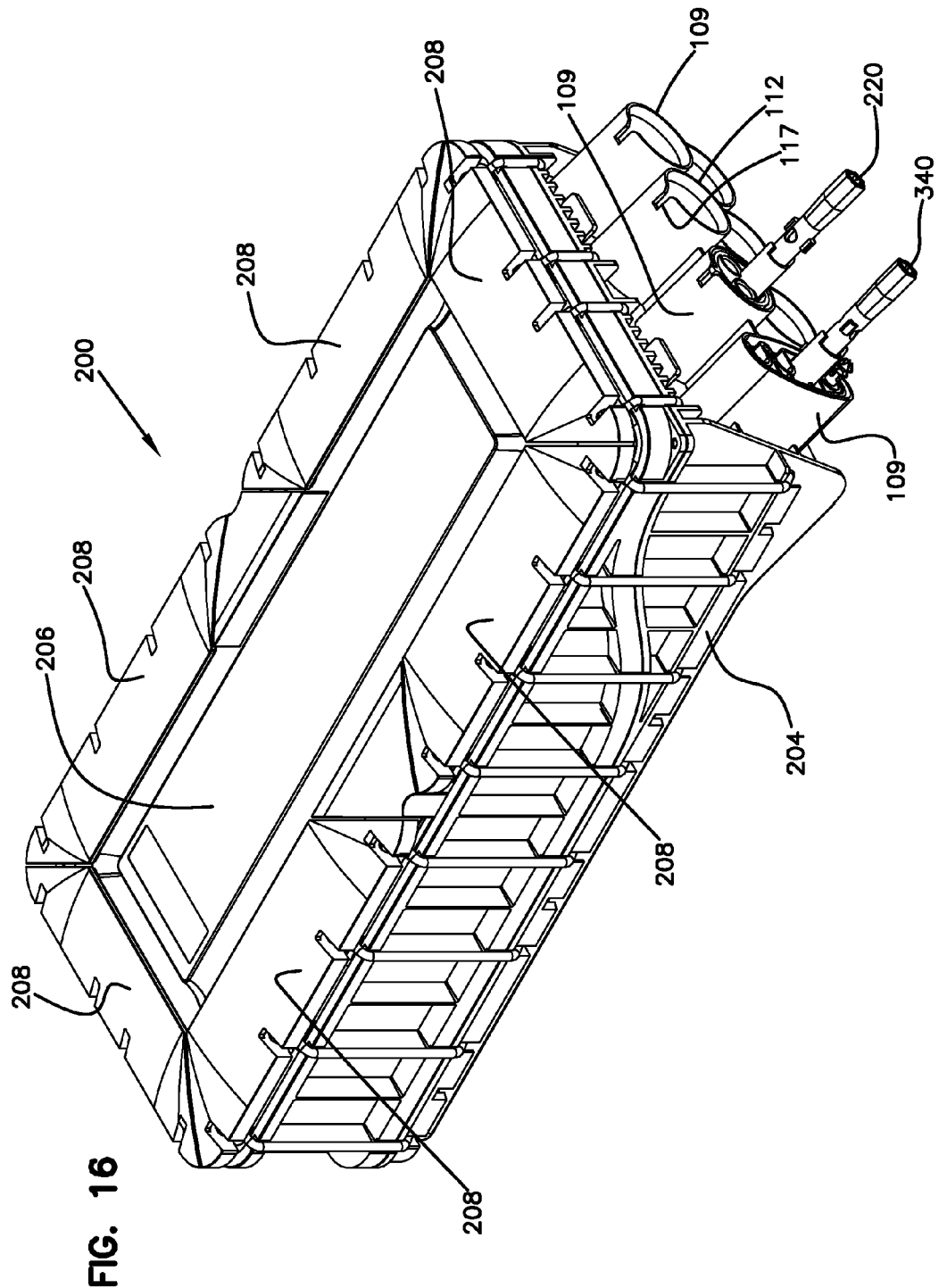
FIG. 16 is a top, front perspective view of an enclosure in the closed and sealed position with alternative seal block assemblies and cable fixation assemblies.
Figure 17:
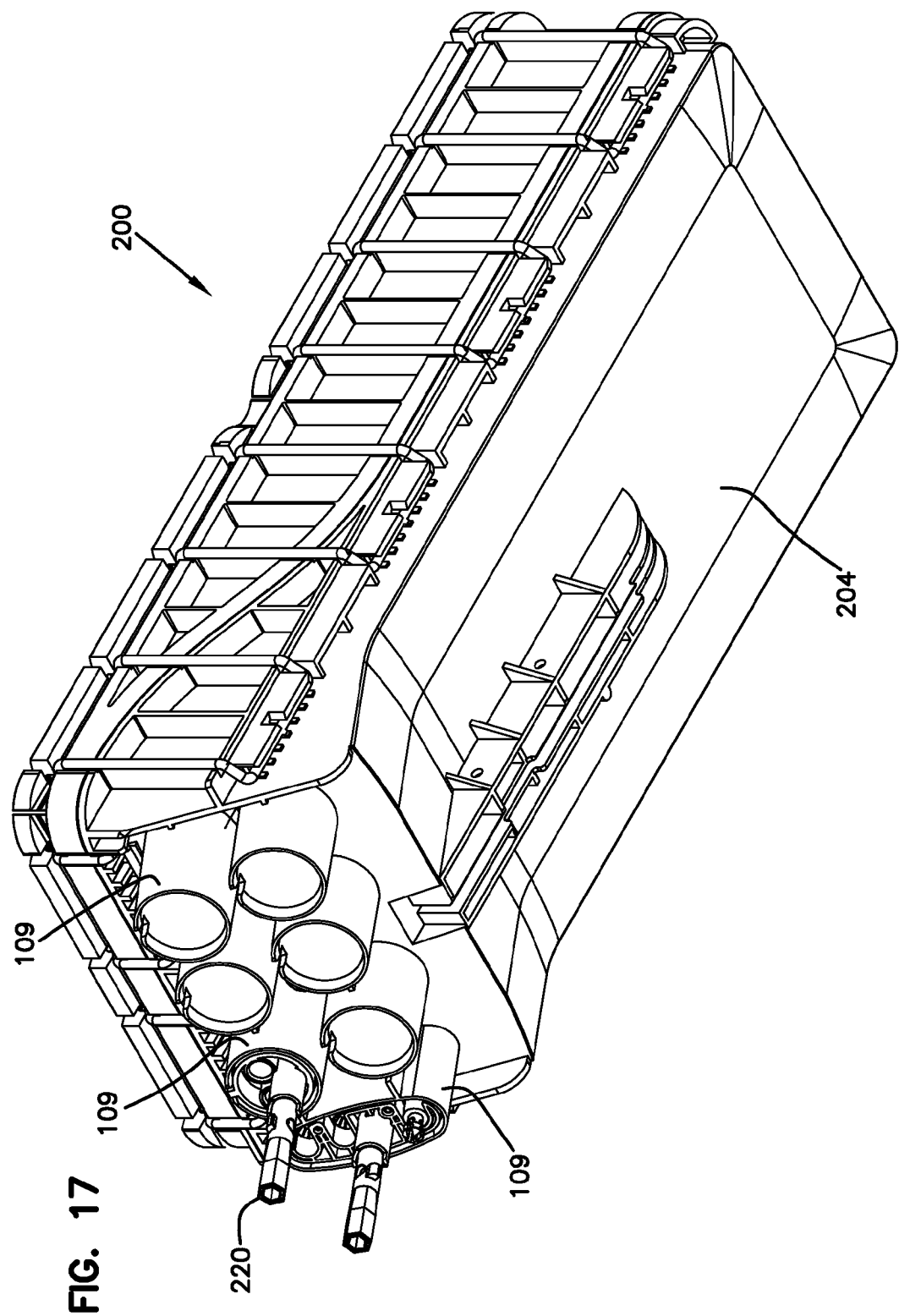
FIG. 17 is a bottom, front perspective of the enclosure of FIG. 16.
Figure 18:
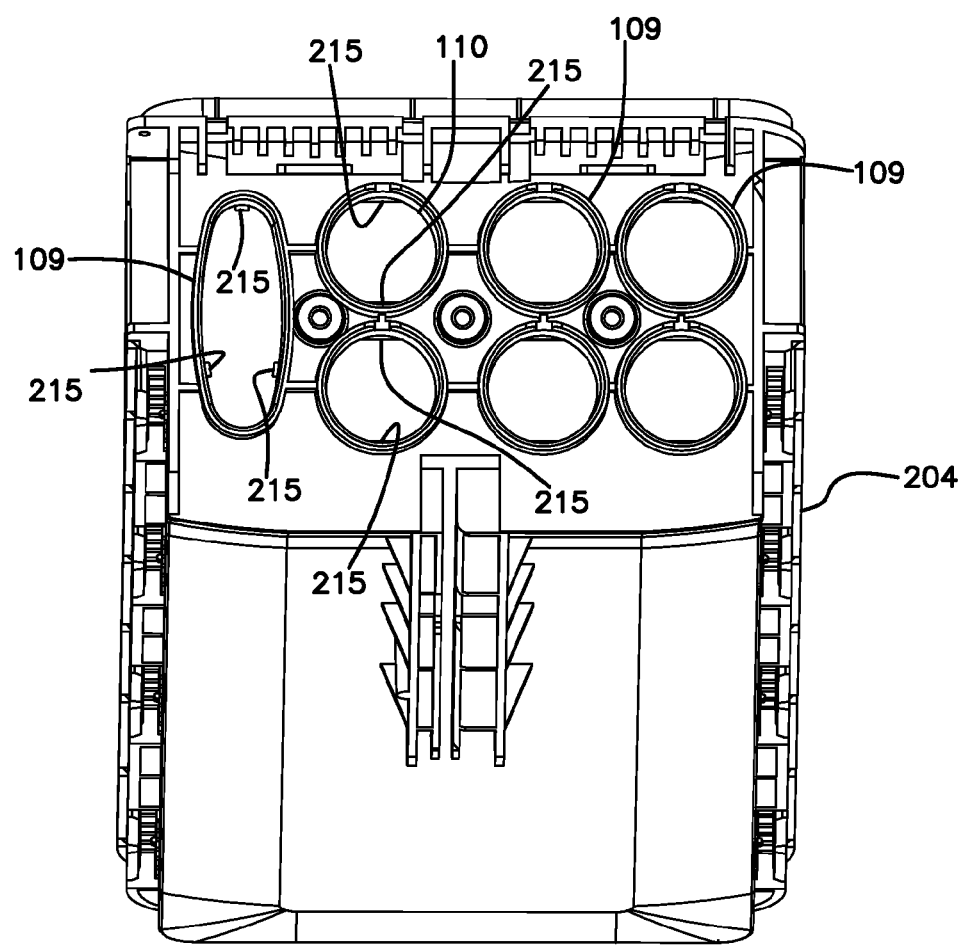
FIG. 18 is a view looking into the empty ports of the base of the enclosure of FIGS. 16 and 17.

FIGS. 16 and 17 show the example seal blocks 220, 340 secured at respective cable ports 109. Each seal block 220, 340 is inserted through the axial passage 114 defined by the elongated body 111 of the duct 110 installed at the respective cable port 109. The first end 222, 342 of each seal block body 221, 341 is inserted through the outer end 112 of each duct and pushed towards the inner end 113 until the stop surfaces 245, 345 of each seal block body 221, 341 abuts the stops 215 of the respective duct 110. The stops 215 inhibit the seal block bodies 221, 341 from being pushed too far into the base 100.

As the seal block body 221, is pushed toward the inner end 113 of the duct 110, the latching fingers 126 cam inwardly to pass the inner end 113 and snap over the shoulder 116 of the duct body 111. The shoulder 228 of the latching fingers 226 abuts the shoulder 116 of the duct body 111 to inhibit the seal block bodies 221, from being pulled out of the ducts 110. If desired, each half 290 can be removed separately to add or adjust a cable. Clip 242 is added to secure seal block body 221 to duct body 111. For seal block body 341, after insertion into duct body 111, clip 347 is added.

In certain implementations, the duct bodies 111 include alignment structures that facilitate mounting the seal blocks in accordance with a preferred orientation. For example, the slot 117 at the outer end 112 of the round ducts 110 may be sized and shaped to receive the tab 129 disposed at the second end 223 of the first seal block body 221. In other implementations, the tab 129 also aids in inhibiting the seal block body 221 from being inserted too far into the duct 110. In still other implementations, one or more tabs may be disposed on the oblong seal block 340.

The gasket 230, 350 of each seal block 220, 340 is spaced towards the exterior of the base 100 from the point at which the seal block 220, 340 is axially fixed to the base 100. In some implementations, the stops 215 and/or tabs 129 aid in maintaining the seal block 220, 340 within the ducts 110 when pressure is applied to the seal block 220, 340 from outside the base 100. External pressure applied to the seal block 220, 340 will further compress the gasket 230, 350 axially since the stops 215 and/or tab 129 maintain the seal block 220, 340 in a fixed axial position.

Figure 20:
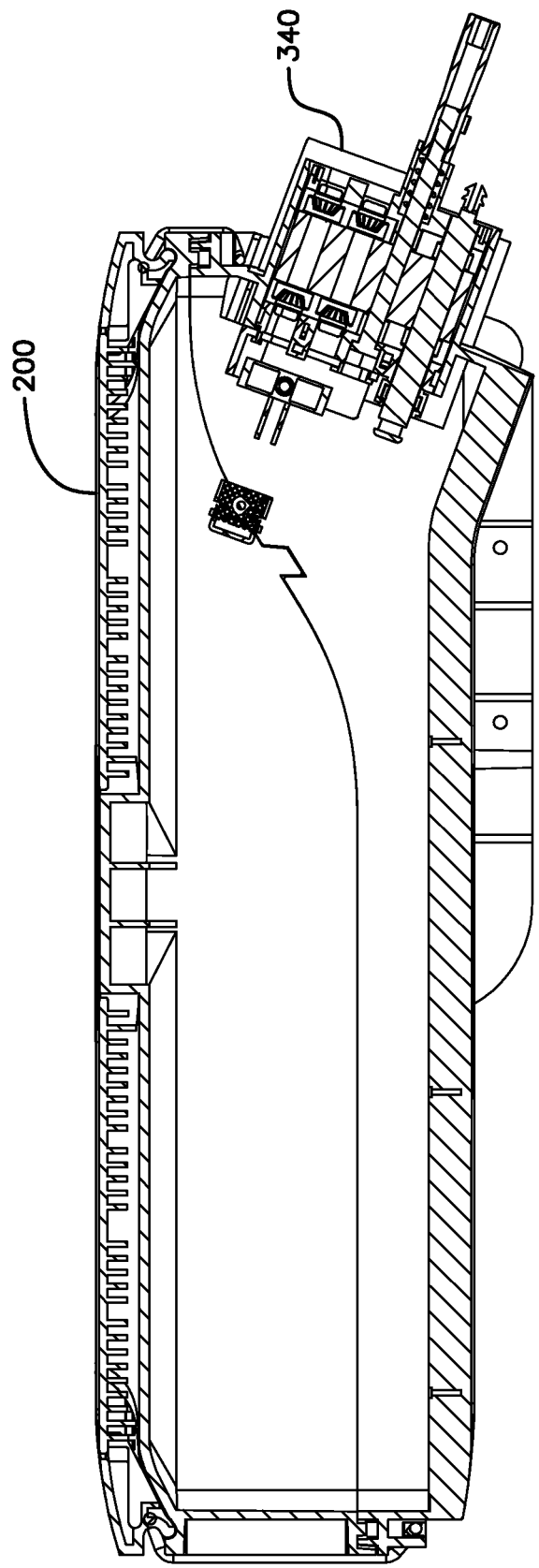
FIG. 20 is a cross-sectional side view of the enclosure of claims 16 and 17, wherein the cross-section passes through the oblong port.
Figure 21:
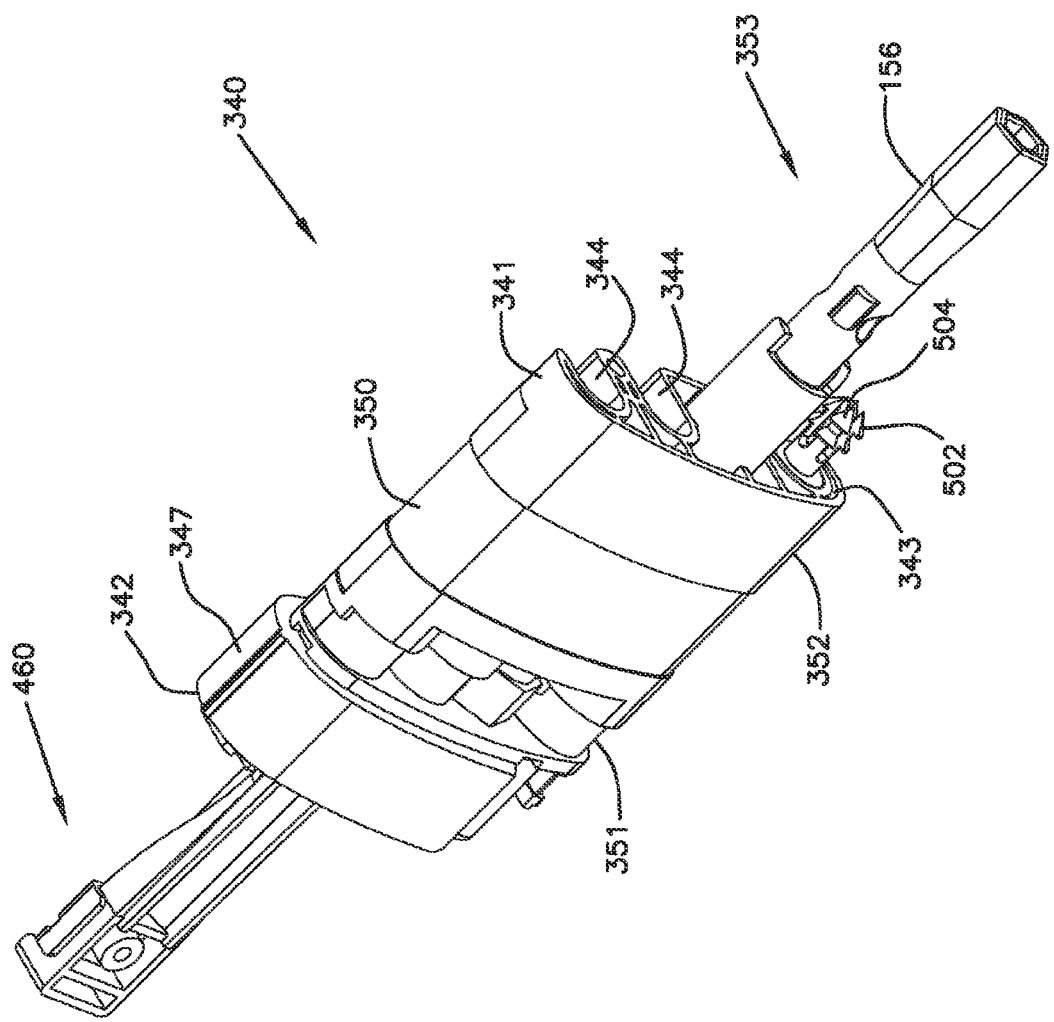
FIG. 21 is a perspective view of an example oblong-type seal block assembly in the enclosure of FIGS. 16 and 17.
Figure 22:
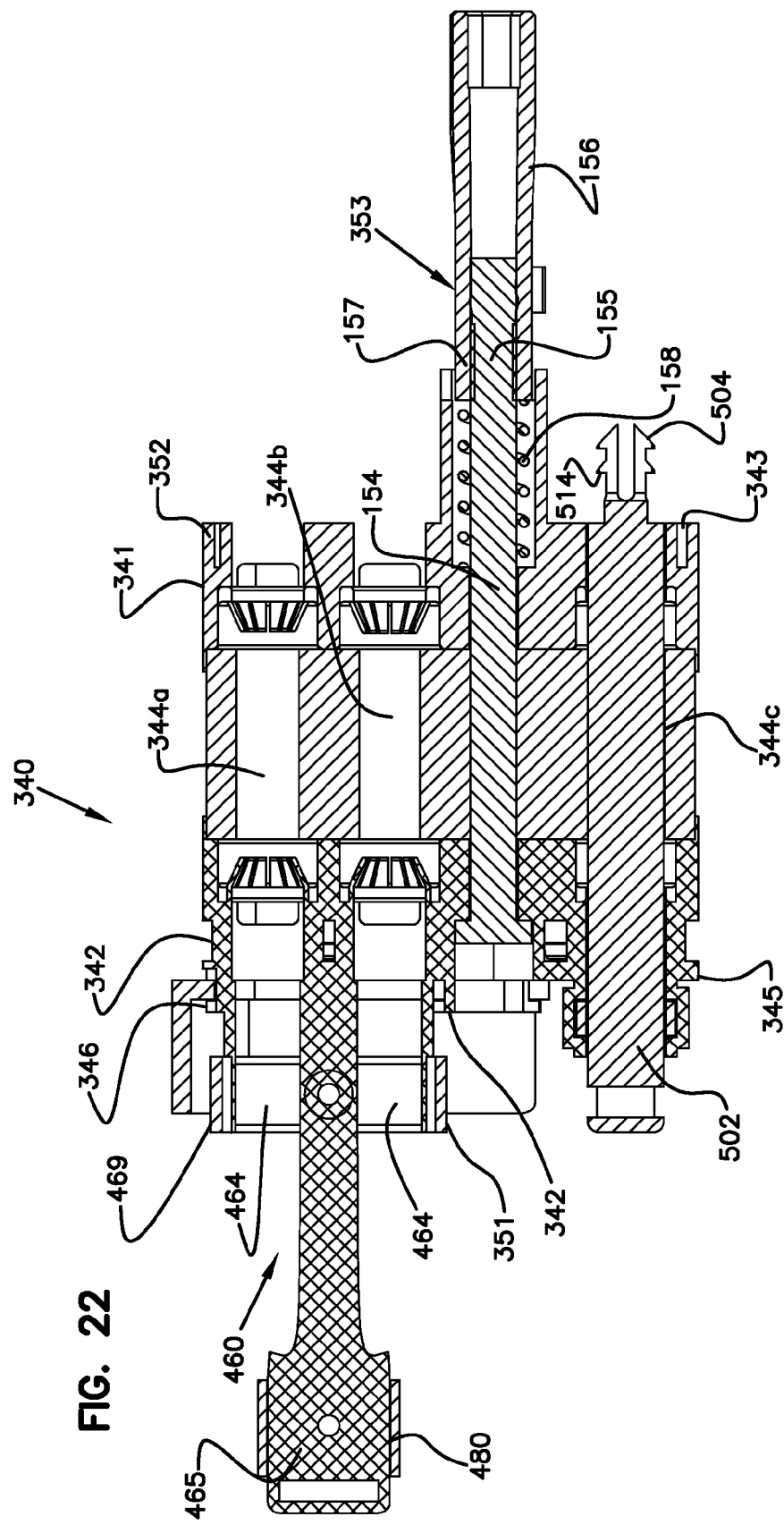
FIG. 22 is a cross-sectional view of the example oblong-type seal block assembly in the enclosure of FIG. 21.
Figure 23:
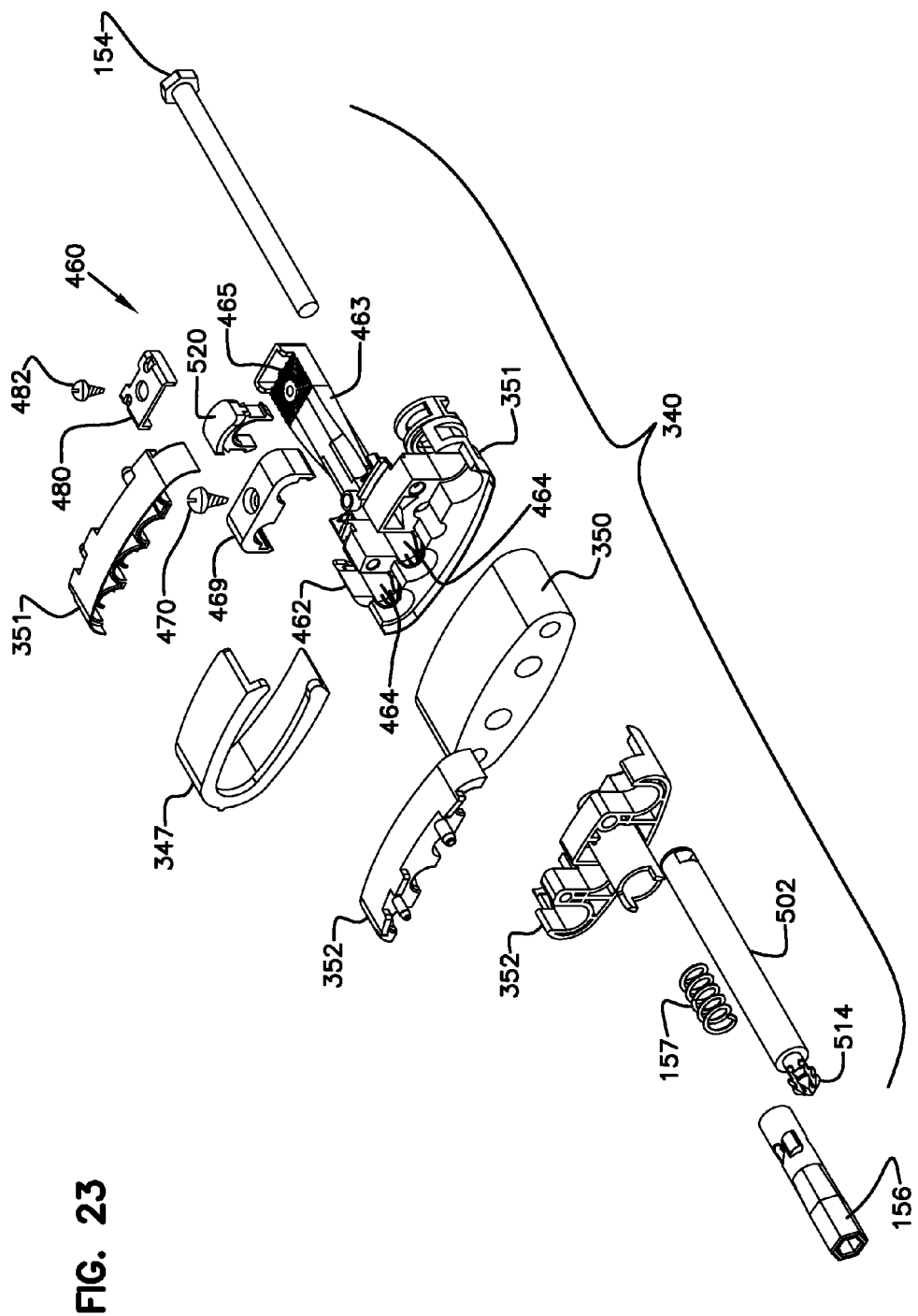
FIGS. 23-25 are exploded views of the example oblong-type seal block assembly of FIG. 22.
Figure 24:
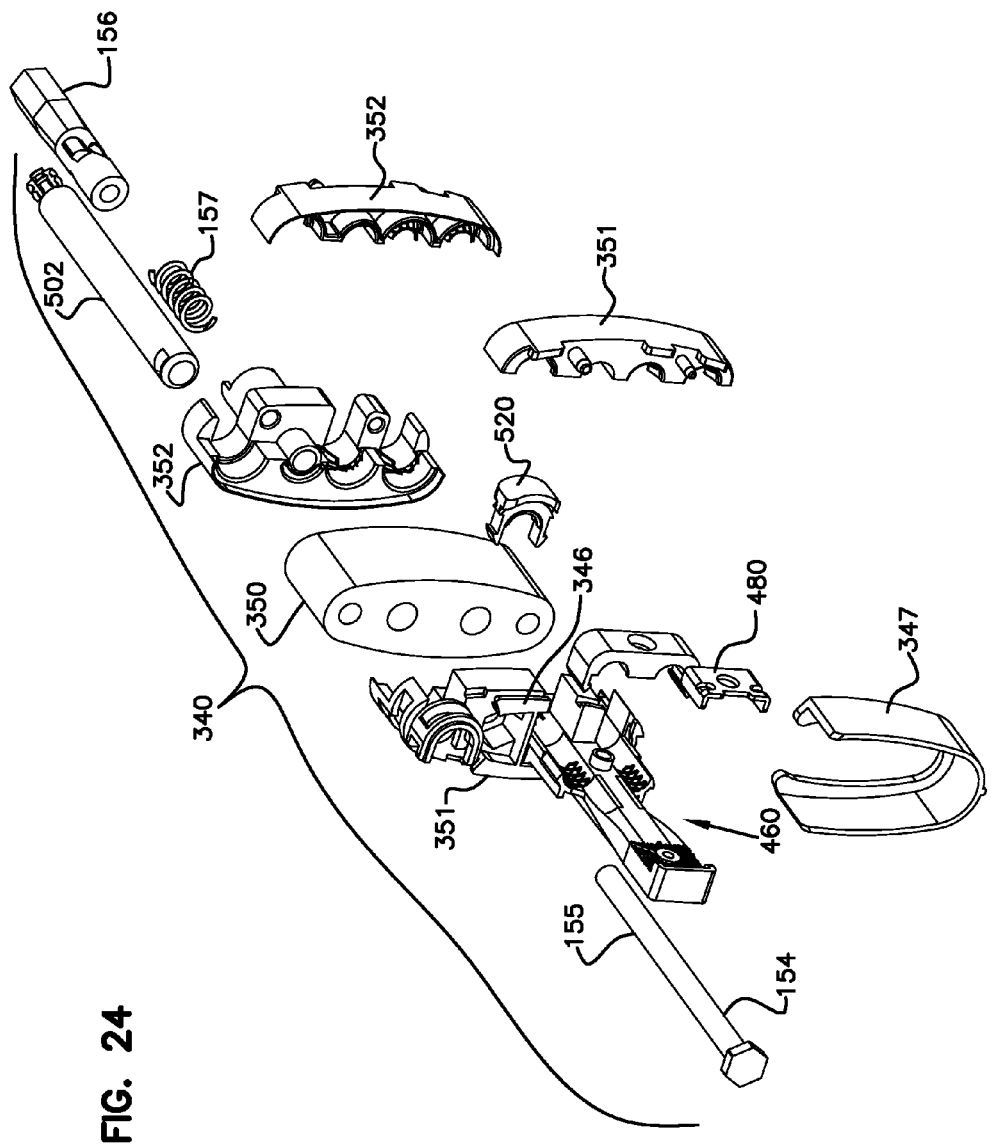
Figure 25:
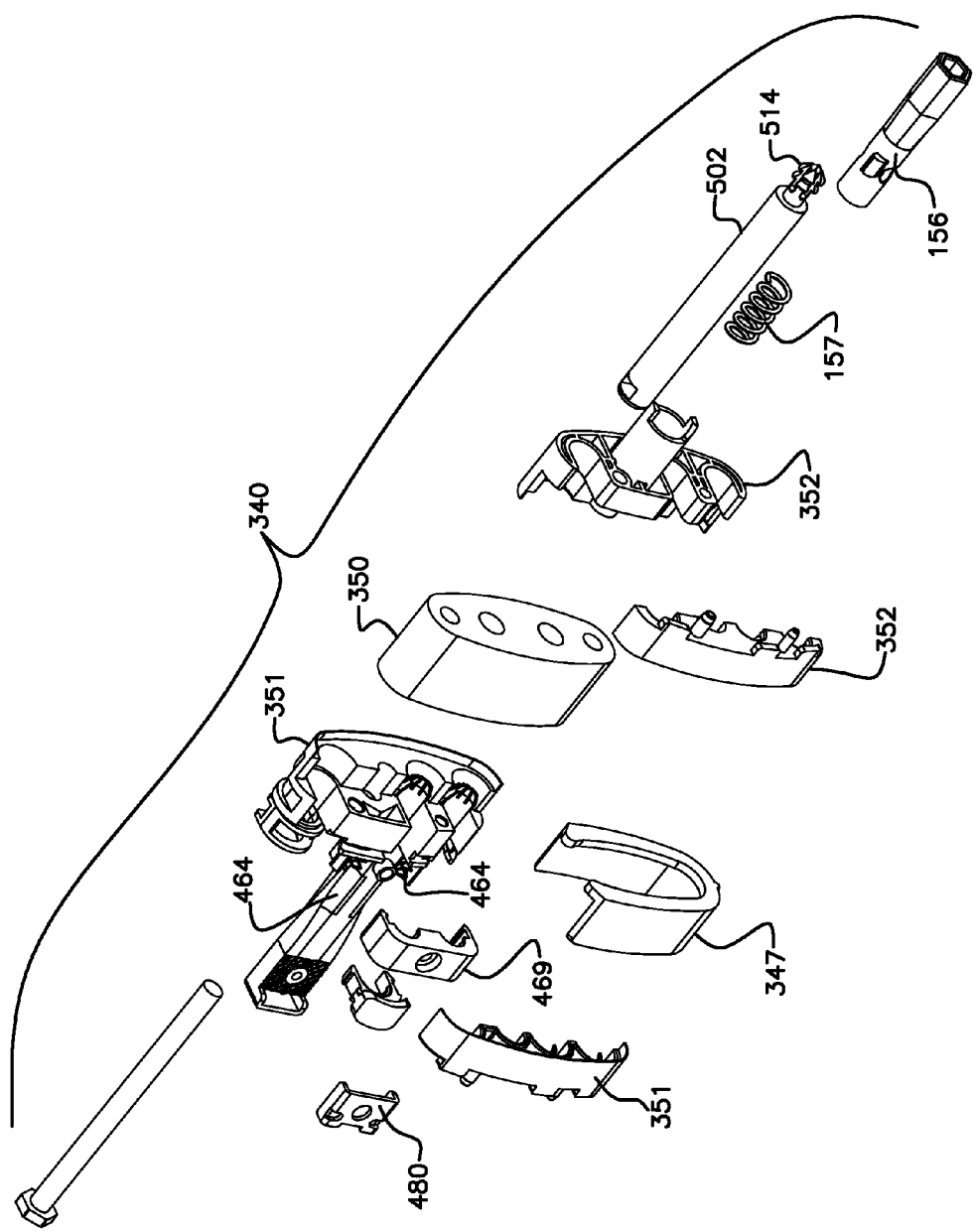

In accordance with some aspects, the optical fiber cables 180 may be secured to the seal blocks 220, 340 using fixation mounts 460 (FIGS. 20, 21, 26). A fixation mount 460 is coupled to an optical fiber cable 180 at a location where one or more strength members have been terminated (e.g., trimmed). The fixation mount 460 is coupled to pieces 231, 351. For example, the fixation mount 460 may be coupled to the seal block assembly body 221, 341 for fixation before the seal is inserted into the port 109. In certain implementations, the fixation mount 460 axially fixes the cable 180 and torsionally fixes the cable 180. In certain implementations, the fixation mount 460 laterally fixes the cable 180. The fixation mount 460 can be integrally formed with seal block bodies 221, 341.

The fiber optic cables 180 include one or more optical fibers 181 and at least one strength member. In certain implementations, the optical fibers 181 are contained within a buffer tube. A jacket 185 is stripped or otherwise removed at a section of the cable that is to be secured to the enclosure. Stripping the jacket 185 reveals the optical fiber(s) 181 and one or more strength members. The strength members may be terminated (e.g., trimmed) at or near the stripped region. In certain implementations, the strength members include a plurality of strength yarns (e.g., aramid yarn, such as Kevlar®) 182. In certain implementations, the strength members include a tensile strength member (e.g., a fiberglass rod) 183 in addition to the strength yarns 182. In other implementations, the strength members include a tensile strength member (e.g., a fiberglass rod) 183 instead of the strength yarns 182. In some implementations, the yarns 182 are not present or not used (e.g., cut-off).

The seal blocks 220, 340 are loaded onto the optical cables 180 before or after the fixation assemblies 460 are coupled to the optical cables 180.

In certain implementations, the optical cables 180 are routed through the passages 224, 344 of the seal blocks 220, 340 before being stripped (e.g., while the jacket 185 still covers the optical fibers 181 and strength members 182, 183). For example, an optical cable 180 may be routed axially through the passage 224 of the round-type seal block 220. In other implementations, however, an optical cable 180 may be routed radially into the passage 144 of the oblong-type seal block 140. Such would be the case for loop cables.

FIGS. 21-25 illustrate one example fixation mount 460. The fixation assembly 460 includes a body 461 extending from a first end 462 to a second end 463. The body 461 defines an axial channel 464 that extends at least partially between the first and second ends 462, 463. In some implementations, the axial channel 464 has a ribbed (e.g., laterally ribbed) or otherwise textured surface. A fiber optic cable 180 may be routed along the channel 464 from the first end 462 towards the second end 463. The textured surface may aid in holding the cable 180 against axial and/or torsional strain. In certain implementations, a cover 469 may be positioned over the channel 464 to clamp or press against the exterior of the cable jacket. Different sized covers 469 can accommodate various sizes of optical fiber cables 180 (i.e., optical cables having various diameters). In some such implementations, the cover 469 has friction promoting surface. One example is the use of a rubber sheet or something with a textured surface. The cover 469 aids in holding the cable 180 against axial and/or torsional strain. In certain implementations, the cover 469 is fastened to body 461 with a fastener 470. Alternatively, a latch to the body 461 can be used.

The jacket 185 of the optical cable 180 terminates at an intermediate position within the fixation body 461. The optical fibers 181 and strength members extend past the jacket 185 towards the second end 463 of the body 461. The strength members may be trimmed at a location spaced from the jacket 185. In some implementations, the jacketed cable 180 extends through the axial channel 464 of the body 461. In such implementations, the cover 469 cooperates with the channel 464 to enclose the jacketed portion of the cable 180. In certain implementations, the cover 469 and the channel 464 cooperate to radially compress the jacketed portion of the cable 180.

The fixation assemblies 460 are configured to retain the strength members of the optical fiber cables 180. In some implementations, the cable fixation body 461 includes a pad area 465 at which the tensile strength member 183 may be retained. The pad area 465 is located at the second end 463 of the body 461. In some implementations, the pad area 465 is axially aligned with the channel 464 of the body 461. The pad area 465 is sized to receive the tensile strength member 183 and still allow the optical fibers 181 to extend past the first pocket 166. Cover 480 presses against tensile strength member 183, and is held in place with a fastener 482. The pad area 465 is textured to facilitate improved fixation.

When coupled to the cables 180, the seal block assemblies 220, 340 and the fixation assemblies 460 cooperate to form cable port assemblies 490 (FIGS. 21 and 26). In this implementation, the seal blocks 220, 340 are slid into the ducts 110 after the fixation assemblies 460 are routed through the ducts 110.

A filler rod removal system 500 and method is provided. If a filler rod 502 is positioned in a seal block assembly, the filler rod 502 is provided with an attachment device 504 to attach to a new tube 510 which can be pushed and/or pulled through the seal block assembly into position during connection of the filler rod 502 and the new tube 510. Typically, the new tube 510 is added when the seal block assembly is deactivated.

One attachment device 504 for the filler rod 502 is one or more barbed projections 514 which fit into the new tube 510, such as a corrugated tube. Generally, the filler rod 502 and the new tube 510 have the same outer diameter.

Once the new tube 510 is located in position in the seal block assembly, the filler rod 502 can be separated from the new tube and discarded, and cables and/or blown tubes can be inserted through the new tube. The seal block assembly can also be reactivated to seal the new tube. Such a system is particularly useful for seal block assemblies 140, 340, but may be used on the other disclosed seal block assemblies.

A tube clip 520 is shown mounted to second seal block assembly for storage. Once new tube 510 is added, clip 520 is inserted into first body assembly 351 to retain tube 510 with first body assembly 351.

Having described the preferred aspects and embodiments of the present invention, modifications and equivalents of the disclosed concepts may readily occur to one skilled in the art. However, it is intended that such modifications and equivalents be included within the scope of the claims which are appended hereto.

PARTS LIST 100 base
101 first end
102 second end
103 first side
104 second side
105 interior
106 sidewall
107 gasket channel
108 base
109 ports
110 ducts
111 elongated body
112 outer end
113 inner end
114 passage
115 stops
116 inner shoulder
117 outer slot
118 fastener support
119 fastener hole
120 first example seal block
121 body
122 first end
123 second end
124 axial passage
125 stop surface
126 flexible finger
127 ramp
128 shoulder
129 rear tab
130 gasket
131 first piece
132 second piece
133 activation assembly
134 screw
135 threaded surface
136 grip
137 threaded surface
138 spring
140 second example seal block
141 body
142 first end
143 second end
144 axial passages
144a first axial passage
144b second axial passage
144c third axial passage
145 front stop surface
146 flexible finger
147 ramp
148 shoulder
150 gasket
151 first body assembly
152 second body assembly
153 activation assembly
154 screw
155 threaded surface
156 grip
157 threaded surface
158 spring
160 cable fixation assembly
161 body
162 first end
163 second end
164 channel
165 winding arrangement
166 first pocket
167 flexible flange
168 set screw
169 sizing flange
170 cover
171 hinge member
172 latching arrangement
173 second pocket
174 slot
175 mounting screw
176 open front
177 shoulders
180 fiber optic cables
181 optical fibers
182 yarn
183 strength member
185 jacket 190 cable port assembly
200 enclosure
204 base
206 cover
208 latches
220 first seal block assembly
221 body
222 first end
223 second end
224 two axial passages
226 flexible fingers
227 ramp
228 shoulder
230 gasket
231 integral body piece
232 second integral body piece
233 activation assembly
240 groove
242 c-clip
245 first stop surface
260 tabs
262 notches
290 halves
340 second seal block assembly
341 body
342 first end
343 second end
344 axial passages
344a first axial passage
344b second axial passage
344c third axial passage
345 stop surfaces
346 grooves
347 clip
350 gasket
351 first body assembly
352 second body assembly
353 activation assembly
460 fixation mount
461 body
462 first end
463 second end
464 axial channel
465 pad area
469 cover
480 cover
482 fastener
490 cable port assemblies
500 filler rod removal system
502 filler rod
504 attachment device
510 new tube
514 barbed projections
520 clip

The invention claimed is:

1. A cable seal block assembly extending from a first end to a second end comprising:
a first housing portion that extends from a first end to a second end and defines at least one axial passage extending therebetween, the first housing portion forming the first end of the cable sealing assembly;
a second housing portion that defines at least one axial passage;
a gasket disposed between the first housing portion and the second housing portion, the gasket defining at least one axial passage that aligns with the at least one axial passage of the first housing portion and the at least one axial passage of the second housing portion; and
an activation assembly that axially compresses the gasket when actuated;
wherein a filler rod is positioned in the at least one axial passage; and
wherein the filler rod includes an attachment device for attaching to an end of a tube and is configured to move together with the tube in the axial direction to position the tube in the at least one axial passage.

2. The cable seal block assembly of claim 1, wherein the tube is corrugated.

3. The cable seal block assembly of claim 1, wherein the attachment device includes one or more barbs.

4. The cable seal block assembly of claim 1, wherein the filler rod and the tube have the same outside diameter.

5. The cable seal block assembly of claim 1, wherein the first housing portion, the second housing portion, and the gasket define three axial passages, wherein two of the axial passages are for receiving a loop cable, and the third axial passage receives the filler rod.

6. A method of using a cable seal block assembly extending from a first end to a second end comprising:
providing a first housing portion that extends from a first end to a second end and defines at least one axial passage extending therebetween, the first housing portion forming the first end of the cable sealing assembly;
providing a second housing portion that defines at least one axial passage;
providing a gasket disposed between the first housing portion and the second housing portion, the gasket defining at least one axial passage that aligns with the at least one axial passage of the first housing portion and the at least one axial passage of the second housing portion; and
providing an activation assembly that axially compresses the gasket when actuated;
wherein a filler rod is positioned in the at least one axial passage;
wherein the filler rod includes an attachment device for attaching to an end of a tube;
deactivating the activation assembly;
attaching a tube to the attachment device of the filler rod;
moving both the tube and the filler rod together in an axial direction, wherein the tube is positioned in the at least one axial passage of the first housing portion, the second housing portion and the gasket, and the filler rod is displaced out of the at least one axial passage of the first housing portion, the second housing portion and the gasket.

7. The method of claim 6, wherein the tube is corrugated.

8. The method of claim 6, wherein the attachment device includes one or more barbs.

9. The method of claim 6, wherein the filler rod and the tube have the same outside diameter.

10. The method of claim 6, wherein the first housing portion, the second housing portion and the gasket define three axial passages, wherein two of the axial passages are for receiving a loop cable, and the third axial passage receives the filler rod.

11. The method of claim 6, further comprising reactivating the activation assembly after the tube is inserted.

* * * * *